US012629716B2

(12) United States Patent
Suzuki et al.

(10) Patent No.: US 12,629,716 B2
(45) Date of Patent: May 19, 2026

(54) SUBSTRATE PROCESSING APPARATUS AND SUBSTRATE PROCESSING METHOD

(71) Applicant: SCREEN HOLDINGS CO., LTD., Kyoto (JP)

(72) Inventors: Masafumi Suzuki, Kyoto (JP); Shigehiro Goto, Kyoto (JP)

(73) Assignee: SCREEN HOLDINGS CO., LTD. (JP)

( * ) Notice: Subject to any disclaimer, the term of this patent is extended or adjusted under 35 U.S.C. 154(b) by 0 days.

(21) Appl. No.: 18/599,020

(22) Filed: Mar. 7, 2024

(65) Prior Publication Data

US 2024/0299971 A1 Sep. 12, 2024

(30) Foreign Application Priority Data

Mar. 9, 2023 (JP) ................................ 2023-036965

(51) Int. Cl.

*B05C 5/02* (2006.01)
*B05C 11/10* (2006.01)
*B05C 11/105* (2006.01)

(52) U.S. Cl.

CPC ........ *B05C 5/0254* (2013.01); *B05C 11/1015* (2013.01); *B05C 11/105* (2013.01)

(58) Field of Classification Search

None

See application file for complete search history.

(56) References Cited

U.S. PATENT DOCUMENTS 7,640,885 B2 * 1/2010 Nakashima ............. B05C 11/08 118/313
7,992,516 B2 * 8/2011 Shida ..................... H05B 33/10 118/712
8,534,222 B2 * 9/2013 Ebisawa ............ H01L 21/6715 118/313

(Continued)

FOREIGN PATENT DOCUMENTS

JP 2005-199208 A 7/2005
JP 2008-264782 A 11/2008

(Continued)

OTHER PUBLICATIONS

Extended European Search Report dated Sep. 13, 2024 issued in corresponding European Patent Application No. 24161318.1.

*Primary Examiner* — Jethro M. Pence
(74) *Attorney, Agent, or Firm* — OSTROLENK FABER LLP

(57) ABSTRACT

A substrate processing apparatus includes a nozzle block in which a slit-like discharge port is formed and a controller. The controller controls an X-direction driver and a Z-direction driver, so that a nozzle block is moved on a substrate with a gap between the nozzle block and the substrate filled with a processing liquid. At this time, the processing liquid is applied onto the substrate. Thereafter, the nozzle block is separated from the substrate, so that a liquid column connecting the nozzle block to the substrate is formed. The nozzle block is moved such that the liquid column changes from a liquid contact state in which the liquid column is in (Continued)

contact with the processing liquid present in a discharge port to a non-contact state in which the liquid column is not in contact with the processing present in the discharge port.

7 Claims, 11 Drawing Sheets

(56) References Cited

U.S. PATENT DOCUMENTS

| | | | | |
|---|---|---|---|---|
| 8,555,807 | B2 * | 10/2013 | Kojima | B41J 2/16535 118/712 |
| 10,632,492 | B2 * | 4/2020 | Nauchi | B23K 3/06 |
| 10,786,827 | B2 * | 9/2020 | Ikushima | B05C 11/1015 |
| 11,148,150 | B2 * | 10/2021 | Choi | B05B 1/3402 |
| 11,378,728 | B2 * | 7/2022 | Ikeda | B05C 5/02 |
| 11,577,269 | B2 * | 2/2023 | Yoshitomi | H01L 23/544 |
| 11,633,969 | B2 * | 4/2023 | Miyazaki | B05B 12/084 427/466 |
| 11,773,492 | B2 * | 10/2023 | Inaba | C23C 18/2033 427/337 |
| 11,805,634 | B2 * | 10/2023 | Forget | H05K 13/0469 |
| 12,162,027 | B2 * | 12/2024 | Ikushima | B05D 1/02 |
| 2005/0081784 | A1 * | 4/2005 | Sakayori | B05C 5/0216 118/305 |
| 2006/0096528 | A1 | 5/2006 | Kawatake et al. | 118/407 |
| 2006/0233952 | A1 * | 10/2006 | Nakashima | B05C 11/08 118/313 |
| 2007/0122559 | A1 * | 5/2007 | Shirakashi | G03F 7/3021 427/457 |
| 2008/0070164 | A1 * | 3/2008 | Hayashida | H01L 21/67225 430/311 |
| 2008/0118629 | A1 * | 5/2008 | Shimoda | H10K 71/135 118/712 |
| 2008/0127888 | A1 * | 6/2008 | Kim | H01L 21/68742 118/500 |
| 2008/0248193 | A1 * | 10/2008 | Nakatsuji | B05C 11/1002 427/407.1 |
| 2009/0239360 | A1 * | 9/2009 | Sato | H05K 3/125 118/313 |
| 2012/0244274 | A1 * | 9/2012 | Yamabe | H01L 24/97 427/58 |
| 2015/0336114 | A1 | 11/2015 | Wakamoto | |
| 2016/0023232 | A1 * | 1/2016 | Ikushima | B05C 11/1034 118/300 |
| 2018/0106428 | A1 * | 4/2018 | Reuter | F16K 31/046 |
| 2022/0142024 | A1 * | 5/2022 | Prentice | B05B 3/02 118/300 |
| 2023/0215741 | A1 * | 7/2023 | Han | H01L 21/67248 134/1.2 |
| 2024/0050977 | A1 * | 2/2024 | Inaba | B05D 1/40 |
| 2024/0286168 | A1 * | 8/2024 | Suzuki | B05C 13/02 |

FOREIGN PATENT DOCUMENTS

| | | | |
|---|---|---|---|
| JP | 2013-098371 | A | 5/2013 |
| JP | 2015-192984 | A | 11/2015 |
| JP | 2015-192987 | A | 11/2015 |
| JP | 2016-150311 | A | 8/2016 |
| JP | 2017-148769 | A | 8/2017 |
| JP | 2017-164700 | A | 9/2017 |
| JP | 6272138 | B2 | 1/2018 |
| JP | 2018-069230 | A | 5/2018 |
| JP | 2019-046850 | A | 3/2019 |
| JP | 2020-011199 | A | 1/2020 |
| JP | 2022-143661 | A | 10/2022 |

* cited by examiner

PROCESS CONDITION
MOVING SPEED : 0
DISTANCE OF GAP : FIRST DISTANCE
ADJUSTMENT SPEED OF DISTANCE OF GAP : 0
INTERNAL PRESSURE : FIRST NEGATIVE PRESSURE

SIDE VIEW

PLAN VIEW

PROCESS CONDITION
MOVING SPEED : FIRST MOVING SPEED
DISTANCE OF GAP : FIRST DISTANCE
ADJUSTMENT SPEED OF DISTANCE OF GAP : 0
INTERNAL PRESSURE : FIRST NEGATIVE PRESSURE

SIDE VIEW

PLAN VIEW

PROCESS CONDITION
MOVING SPEED : FIRST MOVING SPEED→0
DISTANCE OF GAP : FIRST DISTANCE
ADJUSTMENT SPEED OF DISTANCE OF GAP : 0
INTERNAL PRESSURE : FIRST NEGATIVE PRESSURE

SIDE VIEW

PLAN VIEW

PROCESS CONDITION
MOVING SPEED : 0
DISTANCE OF GAP : FIRST DISTANCE→SECOND DISTANCE
ADJUSTMENT SPEED OF DISTANCE OF GAP : FIRST ADJUSTMENT SPEED
INTERNAL PRESSURE : FIRST NEGATIVE PRESSURE→SECOND NEGATIVE PRESSURE

SIDE VIEW

PLAN VIEW

PROCESS CONDITION
MOVING SPEED : 0→FIRST MOVING SPEED
DISTANCE OF GAP : SECOND DISTANCE
ADJUSTMENT SPEED OF DISTANCE OF GAP : 0
INTERNAL PRESSURE : SECOND NEGATIVE PRESSURE→FIRST NEGATIVE PRESSURE

SIDE VIEW

PLAN VIEW

PROCESS CONDITION
MOVING SPEED : FIRST MOVING SPEED
DISTANCE OF GAP : SECOND DISTANCE
ADJUSTMENT SPEED OF DISTANCE OF GAP : 0
INTERNAL PRESSURE : FIRST NEGATIVE PRESSURE

SIDE VIEW

PLAN VIEW

PROCESS CONDITION
MOVING SPEED : FIRST MOVING SPEED→SECOND MOVING SPEED
DISTANCE OF GAP : SECOND DISTANCE→THIRD DISTANCE
ADJUSTMENT SPEED OF DISTANCE OF GAP : SECOND ADJUSTMENT SPEED
INTERNAL PRESSURE : FIRST NEGATIVE PRESSURE

SIDE VIEW

PLAN VIEW

PROCESS CONDITION
MOVING SPEED : SECOND MOVING SPEED
DISTANCE OF GAP : SECOND DISTANCE→THIRD DISTANCE
ADJUSTMENT SPEED OF DISTANCE OF GAP : SECOND ADJUSTMENT SPEED
INTERNAL PRESSURE : FIRST NEGATIVE PRESSURE

SIDE VIEW

PLAN VIEW

SUBSTRATE PROCESSING APPARATUS AND SUBSTRATE PROCESSING METHOD

BACKGROUND

Technical Field

The present disclosure relates to a substrate processing apparatus and a substrate processing method for forming a film of a processing liquid on an upper surface of a substrate.

Description of Related Art

A substrate processing apparatus is used to perform various processes on a substrate such as a semiconductor substrate, a substrate for an FPD (Flat Panel Display) that is used for a liquid crystal display device, an organic EL (Electro Luminescence) display device or the like, a substrate for an optical disc, a substrate for a magnetic disc, a substrate for a magneto-optical disc, a substrate for a photomask, a ceramic substrate or a substrate for a solar cell.

As an example of the substrate processing apparatus, in JP 2019-046850 A, a rotary substrate processing apparatus that forms a resist film on a substrate is described. In the substrate processing apparatus, a resist liquid is supplied to the center portion of the substrate which is held and rotated in a horizontal attitude. The supplied resist liquid spreads toward the peripheral portion of the substrate, so that a film of the resist liquid is formed on the entire upper surface of the substrate. A predetermined process such as a drying process is performed on the substrate on which the film of the resist liquid is formed. Thus, the resist film is formed on the upper surface of the substrate.

As described above, a method of forming a film of a processing liquid on an upper surface of a substrate by supplying the processing liquid (resist liquid) to the upper surface of the rotating substrate is referred to as a spin coating method. With the spin coating method, the processing liquid is spread over the entire upper surface of the rotating substrate with use of a centrifugal force, so that part of the processing liquid supplied onto the substrate is splashed outwardly of the substrate. Therefore, the spin coating method has a limit in regard to utilization efficiency of the processing liquid.

As a method of forming a film of a processing liquid on a substrate, there is a method referred to as a capillary coating method with which a nozzle (processing liquid supplier) having a slit-like discharge port is used in addition to the above-mentioned spin coating method. The capillary coating method is a method of forming a gap between a nozzle and a substrate and drawing out a processing liquid from a slit-like discharge port onto the substrate by utilizing capillary action that occurs because the gap is filled with the processing liquid (see JP 2017-148769 A, for example.)

With the capillary coating method, the processing liquid is drawn out from the discharge port onto the substrate with capillary action occurring. Therefore, the capillary coating method has higher utilization efficiency of the processing liquid than the spin coating method.

Further, in addition to the above-mentioned example, as a method of applying a processing liquid only onto a substrate, there is a method of adjusting a slit-like discharge port in accordance with the width of the substrate, for example (see JP 2017-164700 A, for example.)

SUMMARY

However, with the capillary coating method and the like described in JP 2019-046850 A and JP 2017-148769 A, because a processing liquid drawn out from a nozzle is directly applied to each portion of a substrate, it is difficult to control the thickness of a film in a case in which the positional relationship between the nozzle and the substrate is largely changed. For example, when the nozzle is separated from the substrate after application of the processing liquid to the substrate ends, the thicknesses of the portion from which the nozzle is separated is likely to be large as compared to the thickness of other portions, the portion being a portion of the film of the processing liquid.

Therefore, variations in thickness of a coating film formed on a substrate by the capillary coating method or the like is larger than variations in thickness of a coating film formed on a substrate by the spin coating method.

An object of the present disclosure is to provide a substrate processing apparatus and a substrate processing method with which it is possible to make a thickness of a film of a processing liquid formed on a substrate be uniform while suppressing wasteful consumption of the processing liquid.

A substrate processing apparatus according to one aspect of the present disclosure that forms a film of a processing liquid on an upper surface of a substrate at least partially having a circular outer periphery, includes a substrate holder that holds the substrate, a nozzle having a nozzle tip portion in which a slit-like discharge port extending in one direction is formed, a mover that relatively moves at least one of the substrate and the nozzle with respect to another one in a lateral direction that intersects with a longitudinal direction of the discharge port, and a controller that controls the mover, and the controller causes the mover to perform a first moving work for relatively moving the substrate and the nozzle in the lateral direction while supplying the processing liquid onto the upper surface of the substrate from the discharge port, with a gap that is equal to or smaller than a predetermined length formed between the nozzle tip portion and the substrate and with the gap filled with the processing liquid, and a second moving work for further relatively moving the substrate and the nozzle in the lateral direction such that a liquid column connecting the processing liquid present on the upper surface of the substrate to the processing liquid adhering to an outer surface of the nozzle tip portion changes from a liquid contact state in which the liquid column is in contact with the processing liquid present in the discharge port to a non-contact state in which the liquid column is not in contact with the processing liquid present in the discharge port after the first moving work.

A substrate processing apparatus according to another aspect of the present disclosure that forms a film of a processing liquid on an upper surface of a substrate having an at least partially circular outer periphery, includes a substrate holder that holds the substrate, a nozzle having a nozzle tip portion in which a slit-like discharge port extending in one direction is formed, a mover that relatively moves at least one of the substrate and the nozzle with respect to another one in a lateral direction that intersects with a longitudinal direction of the discharge port, a lifter-lowerer that changes a length of a gap between the nozzle tip portion and the substrate in an upward-and-downward direction by moving at least one of the substrate held by the substrate holder and the nozzle with respect to another one in the upward-and-downward direction, a pressure adjuster that adjusts a pressure of a processing liquid in the nozzle, and a controller that controls the mover, the lifter-lowerer and the pressure adjuster, and the controller, by controlling the mover, the lifter-lowerer and the pressure adjuster, relatively moves the substrate and the nozzle in the lateral direction such that the processing liquid in the nozzle is drawn out from the discharge port onto the upper surface of the substrate due to capillary action that occurs in a gap in a state in which a pressure of the processing liquid in the nozzle is maintained at a predetermined first negative pressure, the gap equal to or smaller than a predetermined length is formed between the nozzle tip portion and the substrate, and the gap is filled with the processing liquid, and by controlling the lifter-lowerer and the pressure adjuster, thereafter changes a length of the gap between the nozzle tip portion and the substrate to a length larger than the predetermined length while adjusting a pressure of the processing liquid in the nozzle to a second negative pressure lower than the first negative pressure with the discharge port overlapping with part of the substrate in a plan view.

A substrate processing method according to yet another aspect of the present disclosure of forming a film of a processing liquid on an upper surface of a substrate having an at least partially circular outer periphery, includes holding the substrate with use of a substrate holder, preparing a nozzle having a nozzle tip portion in which a slit-like discharge port extending in one direction is formed, a first moving step of relatively moving the substrate and the nozzle in a lateral direction of the nozzle while supplying the processing liquid onto the upper surface of the substrate from the discharge port, with a gap equal to or smaller than a predetermined length formed between the nozzle tip portion and the substrate and with the gap filled with the processing liquid, and a second moving step of further relatively moving the substrate and the nozzle in the lateral direction such that a liquid column connecting the processing liquid present on the upper surface of the substrate to the processing liquid adhering to an outer surface of the nozzle tip portion changes from a liquid contact state in which the liquid column is in contact with the processing liquid present in the discharge port to a non-contact state in which the liquid column is not in contact with the processing liquid present in the discharge port after the first moving step is performed.

A substrate processing method according to yet another aspect of the present disclosure of forming a film of a processing liquid on an upper surface of a substrate having an at least partially circular outer periphery, includes holding the substrate with use of a substrate holder, preparing a nozzle having a nozzle tip portion in which a slit-like discharge port extending in one direction is formed, a first pressure adjusting step of adjusting a pressure of the processing liquid in the nozzle to a predetermined first negative pressure, a first gap forming step of forming a gap equal to or smaller than a predetermined length between the nozzle tip portion and the substrate by moving at least one of the substrate held by the substrate holder and the nozzle with respect to another one in an upward-and-downward direction, a moving step of relatively moving at least one of the substrate and the nozzle with respect to another one in a lateral direction that intersects with a longitudinal direction of the discharge port such that the processing liquid in the nozzle is drawn out from the discharge port onto the upper surface of the substrate due to capillary action that occurs in a gap formed between the nozzle tip portion and the substrate with the gap filled with the processing liquid in a period during which the first pressure adjusting step and the first gap forming step are performed, a second pressure adjusting step of adjusting the pressure of the processing liquid in the nozzle to a second negative pressure lower than the first negative pressure with the discharge port overlapping with part of the substrate in a plan view after the moving step, and a second gap forming step of changing a length of a gap between the nozzle tip portion and the substrate to a length larger than the predetermined length during the second pressure adjusting step.

Other features, elements, characteristics, and advantages of the present disclosure will become more apparent from the following description of preferred embodiments of the present disclosure with reference to the attached drawings.

DETAILED DESCRIPTION

A substrate processing apparatus and a substrate processing method according to one embodiment of the present disclosure will be described below with reference to the drawings. In the following description, a substrate refers to a substrate for an FPD (Flat Panel Display) that is used for a liquid crystal display device, an organic EL (Electro Luminescence) display device or the like, a semiconductor substrate, a substrate for an optical disc, a substrate for a magnetic disc, a substrate for a magneto-optical disc, a substrate for a photomask, a ceramic substrate, a substrate for a solar cell or the like. Further, a substrate, described below, has a circular shape except for a portion in which a notch is formed in a plan view.

1. Configuration of Substrate Processing Apparatus

<1> Overview

Figure 1:
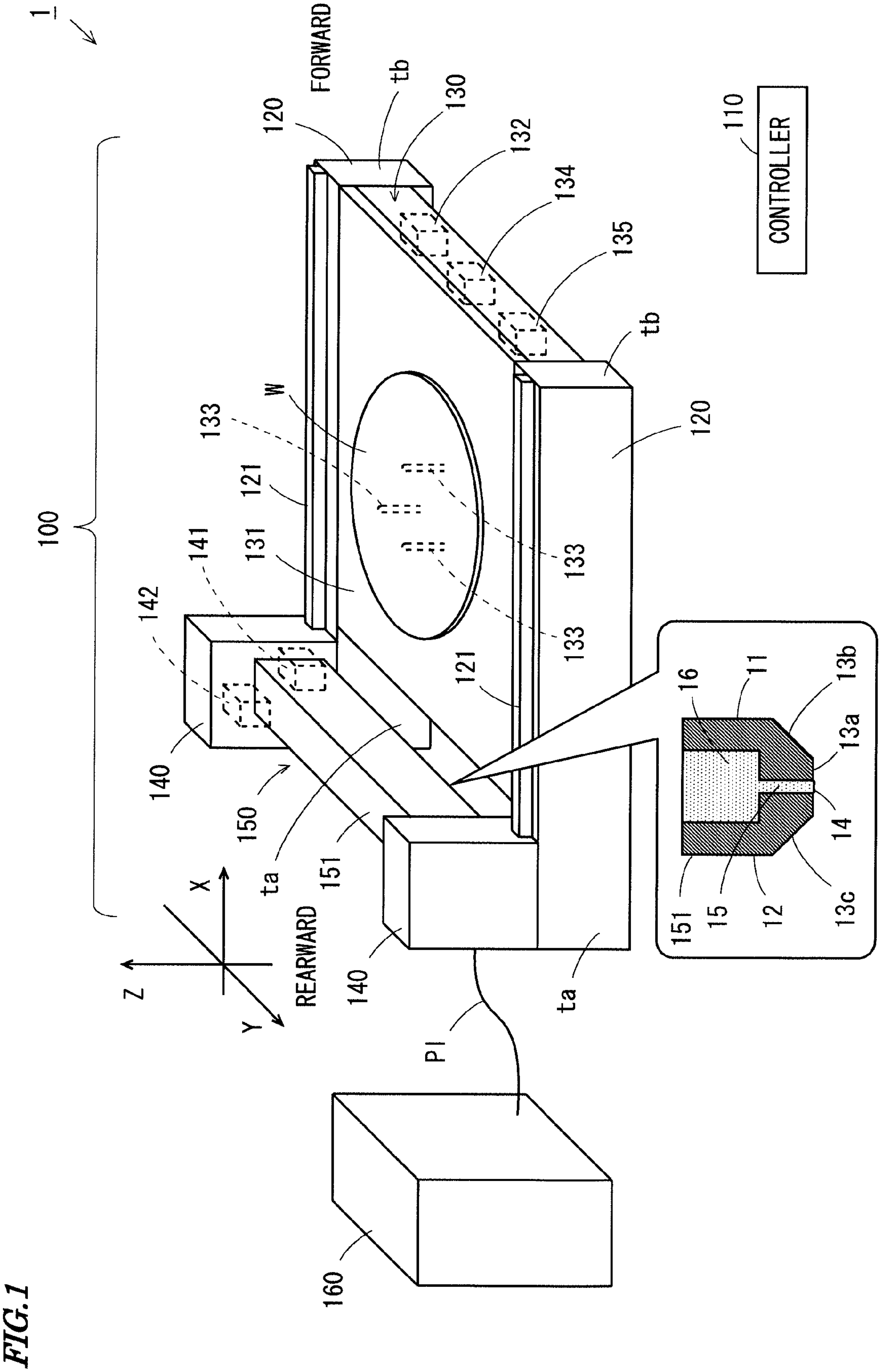
FIG. 1 is a schematic external perspective view of a substrate processing apparatus according to one embodiment of the present disclosure.

FIG. 1 is a schematic external perspective view of a substrate processing apparatus according to one embodiment of the present disclosure. As shown in FIG. 1, the substrate processing apparatus 1 includes a coating device 100, a controller 110 and a processing liquid supply system 160, and is accommodated in a casing (not shown). FIG. 1 is accompanied by arrows that indicate X, Y and Z directions orthogonal to one another for the clarity of a positional relationship. The X and Y directions are orthogonal to each other within a horizontal plane, and the Z direction corresponds to an upward-and-downward direction (vertical direction).

The coating device 100 is configured to be capable of performing a coating process of forming a film of a processing liquid on a substrate W, and includes two stage supports 120, a stage device 130, two nozzle supports 140 and a nozzle device 150. In the present embodiment, the processing liquid used in the coating device 100 is a coating liquid for a resist film (resist liquid) or a coating liquid for an anti-reflection film (an anti-reflection liquid). The substrate W to be subjected to the coating process in the coating device 100 of the present example has a diameter of roughly 300 mm.

The controller 110 controls the work of each component of the coating device 100. The processing liquid supply system 160 supplies the processing liquid to the coating device 100. Details of the controller 110 and the processing liquid supply system 160 will be described below.

<2> Coating Device 100

Each of the two stage supports 120 of the coating device 100 has a substantially cuboid shape extending in one direction, and is provided on the bottom surface of the casing (not shown) so as to extend in the X direction. The two stage supports 120 are arranged side by side in the Y direction. A guide rail 121 extending in the longitudinal direction of the stage support 120 is provided on the upper surface of each stage support 120. In the following description, a direction directed from one end portion ta to the other end portion tb of the stage support 120 is referred to as forward of the coating device 100, and a direction directed from the other end portion tb to the one end portion ta of the stage support 120 is referred to as rearward of the coating device 100.

The stage device 130 is located between the two stage supports 120 in the Y direction and is supported by the two stage supports 120. The stage device 130 includes a plate member 131, a plate adjuster 132, a plurality (three in the present example) of support pins 133, a pin lifting-lowering driver 134 and a suction driver 135.

The plate member 131 is formed of a stone material having a rectangular flat plate shape, for example, and constitutes an upper surface portion of the stage device 130. On a portion of the plate member 131, the substrate W to be processed is placed.

In the portion of the plate member 131 on which the substrate W is to be placed (hereinafter referred to as a substrate placement portion), a plurality of intake holes and a plurality of pin insertion holes (not shown) are formed so as to penetrate the plate member 131 in the Z direction.

The plate adjuster 132, the plurality of support pins 133, the pin lifting-lowering driver 134 and the suction driver 135 are provided below the plate member 131. The plate adjuster 132 includes a heater or the like and adjusts the temperature of the substrate placement portion of the plate member 131.

The plurality of support pins 133 are supported by the pin lifting-lowering driver 134 so as to extend in the Z direction and overlap with the plurality of pin insertion holes of the substrate placement portion in a plan view. The pin lifting-lowering driver 134 moves the plurality of support pins 133 in the Z direction based on the control of the controller 110. Thus, the upper end portions of the plurality of support pins 133 are moved between a pin lifted position higher than the plate member 131 and a pin lowered position lower than the plate member 131 through the plurality of pin insertion holes.

When the substrate W is carried in, with the upper end portions of the plurality of support pins 133 located at the pin lifted position, the unprocessed substrate W held by the transport device (not shown) is transferred onto the plurality of support pins 133. Further, when the substrate W is carried out, with the upper end portions of the plurality of support pins 133 located at the pin lifted position, the unprocessed substrate W supported on the plurality of support pints 133 is received by the transport device (not shown). Further, during the coating process for the substrate W in the coating device 100, with the upper end portions of the plurality of support pins 133 at the pin lowered position, the processing liquid is supplied to the substrate W placed on the substrate placement portion of the plate member 131.

The plurality of intake holes formed in the plate member 131 are connected to exhaust equipment or the like of a factory through the suction driver 135 and an intake system (not shown). Based on the control of the controller 110, the suction driver 135 switches an intake path formed between the plurality of intake holes and the intake system, between a communication state and a blocked state. With such a configuration, with the substrate W placed on the substrate placement portion of the plate member 131, the suction driver 135 can cause the substrate W to be held by suction at the substrate placement portion by bringing the intake path into the communication state. Further, with the substrate W held by suction at the substrate placement portion, the suction driver 135 can release the substrate W from the plate member 131 by bringing the intake path into the blocked state.

The two nozzle supports 140 are respectively provided on the upper surfaces of the two stage supports 120. The two nozzle supports 140 are arranged side by side in the Y direction. Each of the two nozzle supports 140 is movable in the X direction (the forward-and-rearward direction of the coating device 100) along the guide rail 121 of the stage support 120 at which the nozzle support 140 is provided.

The nozzle device 150 is located between the two nozzle supports 140 in the Y direction and is supported by the two nozzle supports 140. In at least one of the two nozzle supports 140, an X-direction driver 141 and a Z-direction driver 142 are incorporated.

The nozzle device 150 includes a nozzle block 151. The nozzle block 151 has a substantially cuboid shape extending in one direction. Both end portions of the nozzle block 151 are respectively supported by the two nozzle supports 140. In FIG. 1, the longitudinal cross-sectional view of a lower half portion of the nozzle block 151 (the cross-sectional view of the lower half portion of the nozzle block 151 taken along the vertical plane orthogonal to the Y direction) is shown in the balloon. As shown in the longitudinal cross sectional view, the nozzle block 151 has a front surface 11 directed forwardly of the coating device 100 and a rear surface 12 directed rearwardly of the coating device 100.

Further, the nozzle block 151 has a substrate facing surface **13*a*, a front inclined surface 13*b* and a rear inclined surface 13*c*. In a side view in which the nozzle block 151 is viewed in the Y direction, the front inclined surface 13*b* extends rearwardly and downwardly from the lower end portion of the front surface 11. On the other hand, in a side view in which the nozzle block 151 is viewed in the Y direction, the rear inclined surface 13*b* extends forwardly and downwardly from the lower end portion of the rear surface 12. The substrate facing surface 13***a* connects the lower end portion of the front inclined surface 13*b* to the lower end portion of the rear inclined surface 13*c* so as to be parallel to the horizontal plane. A slit-like discharge port 14 is formed in the substrate facing surface 13*a*. The discharge port 14 extends in the Y direction.

A liquid flow path 15 and a storage 16 are formed in the nozzle block 151. The storage 16 is formed to be capable of storing a certain amount of the processing liquid. The liquid flow path 15 is formed from the storage 16 to the discharge port 14. Thus, the inner space of the storage 16 communicates with the space below the nozzle block 151 (the outer space of the nozzle block 151) through the liquid flow path 15 and the discharge port 14. A pipe PI that forms part of the processing liquid supply system 160 is connected to the nozzle block 151. The processing liquid is supplied from the pipe PI of the processing liquid supply system 160 into the storage 16 of the nozzle block 151.

The X-direction driver 141 includes an actuator such as a motor, and moves the nozzle support 140 in the X direction on the guide rail 121 of the stage support 120 based on the control of the controller 110. The Z-direction driver 142 includes an actuator such as a motor, and moves the nozzle device 150 supported by the nozzle supports 140 in the Z direction based on the control of the controller 110.

During the coating process for the substrate W, with the substrate W held by suction on the plate member 131, the nozzle block 151 is brought close to the upper surface of the substrate W, and the nozzle device 150 is moved in the X direction in the space above the substrate W. At this time, the position (height position) of the nozzle device 150 in the Z direction is adjusted such that the processing liquid in the nozzle block 151 is drawn (discharged) from the discharge port 14 to the gap between the nozzle block 151 and the substrate W due to capillary action. In this manner, a method of supplying the coating liquid onto the substrate W from the discharge port of the nozzle by utilizing capillary action is referred to as a capillary coating method.

<3> Processing Liquid Supply System 160

Figure 2:
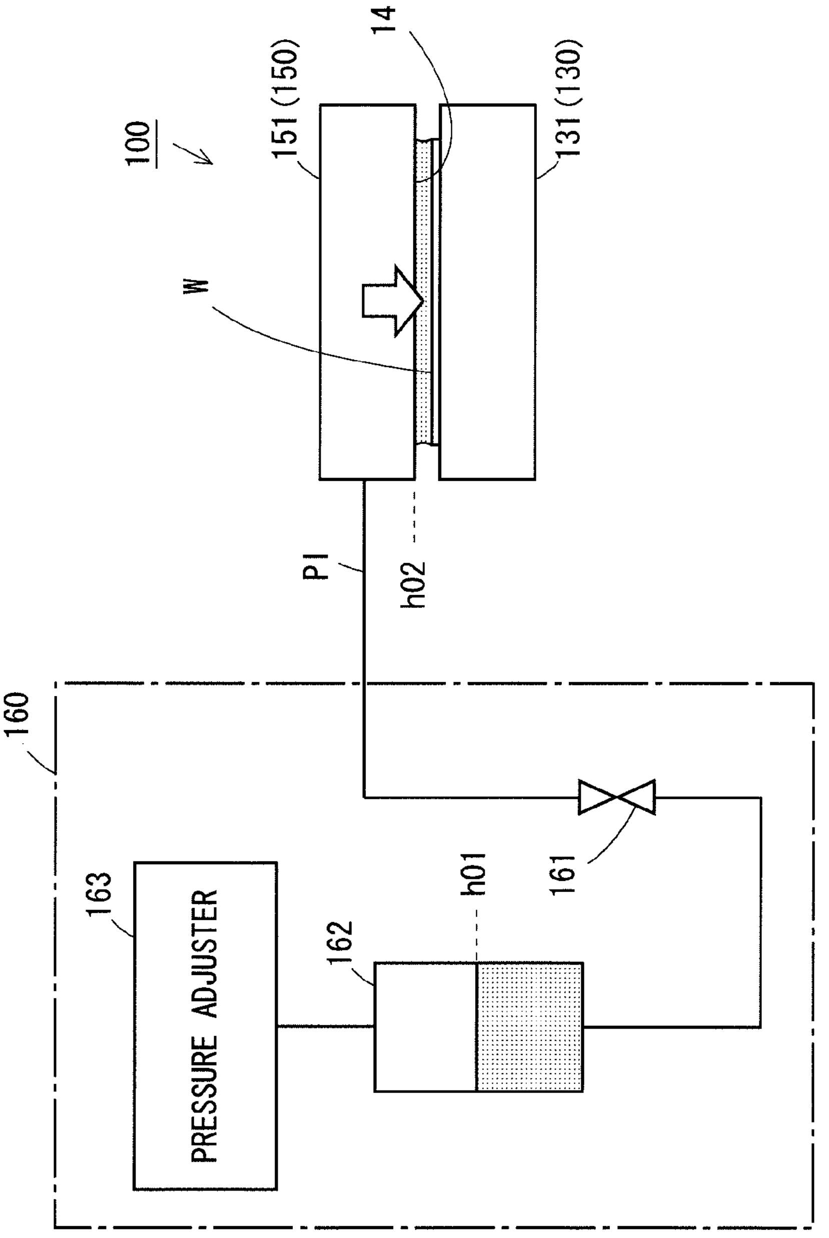
FIG. 2 is a diagram for explaining the basic configuration of a processing liquid supply system.

Details of the processing liquid supply system 160 will be described. FIG. 2 is a diagram for explaining the basic configuration of the processing liquid supply system 160. In FIG. 2, the nozzle block 151 and the plate member 131 of FIG. 1 are schematically shown together with the basic configuration of the processing liquid supply system 160.

As shown in FIG. 2, the processing liquid supply system 160 includes a valve 161, a processing liquid tank 162, a pressure adjuster 163 and the pipe PI. In the processing liquid tank 162, the processing liquid used for the coating process for the substrate W is stored. The pipe PI connects a bottom portion of the processing liquid tank 162 to the nozzle device 150. The valve 161 is provided in the pipe PI. The valve 161 is opened, so that the inner space of the processing liquid tank 162 and the inner space of the storage 16 of the nozzle block 151 of FIG. 1 communicate with each other. Thus, the processing liquid can be supplied from the processing liquid supply system 160 to the nozzle device 150. The valve 161 is closed, so that the flow path of the processing liquid in the pipe PI is blocked, and the processing liquid cannot be supplied from the processing liquid supply system 160 to the nozzle device 150.

The pressure adjuster 163 is an electric pneumatic regulator, for example, and changes the pressure in the processing liquid tank 162. The pressure adjuster 163 may include another pressure adjusting means such as various pumps or aspirators instead of the electric pneumatic regulator as long as the pressure in the inner space of the processing liquid tank 162 can be adjusted.

During the coating process for the substrate W by the capillary coating method, the nozzle block 151 of the nozzle device 150 is brought close to the substrate W placed on the plate member 131 as described above. Further, the valve 161 is opened, and the gap between the nozzle block 151 and the substrate W is filled with the processing liquid. Thus, capillary action occurs in the gap between the nozzle block 151 and the substrate W, and a force that draws the processing liquid from the discharge port 14 to the upper surface of the substrate W is exerted on the processing liquid in the nozzle block 151 as indicated by the outlined arrow in FIG. 2.

On the other hand, a force corresponding to the relationship between a height position h01 of the liquid surface of the processing liquid stored in the processing liquid tank 162 and a height position h02 of the discharge port 14 is generated in the processing liquid present in the nozzle block 151. For example, when the height position h01 of the liquid surface of the processing liquid is lower than the height position h02 of the discharge port 14, a force that causes the processing liquid in the nozzle block 151 to flow into the storage 16 from the liquid flow path 15 is generated. On the other hand, when the height position h01 of the liquid surface of the processing liquid is higher than the height position h02 of the discharge port 14, a force that causes the processing liquid to flow out of the nozzle block 151 from the discharge port 14 is generated. The larger the difference between the two height positions h01, h02, the larger the above-mentioned force that causes the processing liquid to flow in and the above-mentioned force that causes the processing liquid to flow out. Therefore, in a case in which the difference between the height positions h01, h02 is 0, no force corresponding to the relationship between the two height positions h01, h02 is generated in the processing liquid present in the nozzle block 151. In this case, only a force caused by capillary action that occurs in the gap between the nozzle block 151 and the substrate W is exerted on the processing liquid in the nozzle block 151.

Here, a force generated in the processing liquid in the nozzle block 151 except for the force caused by capillary action is a force caused by a pressure of the processing liquid present in the nozzle block 151 (an internal pressure of the nozzle block 151).

As such, during the coating process for the substrate W by the capillary coating method, the balance between a force exerted on the processing liquid due to the above-mentioned capillary action and the internal pressure of the nozzle block 151 is suitably adjusted. The pressure adjuster 163 of the processing liquid supply system 160 works to adjust the internal pressure of the nozzle block 151. The pressure adjuster 163 changes the pressure in the processing liquid tank 162, so that the internal pressure of the nozzle block 151 is changed. Thus, an amount of the processing liquid (a discharge amount of the processing liquid) drawn out from the nozzle block 151 onto the substrate W during the coating process for the substrate W is adjusted.

In the present embodiment, during the coating process for the substrate W, the pressure in the processing liquid tank 162 is adjusted such that the internal pressure of the nozzle block 151 is moderately a negative pressure while discharge of the processing liquid to the substrate W is allowed. In this case, a force that causes the processing liquid in the nozzle block 151 to flow from the liquid flow path 15 into the storage 16 is moderately generated. Therefore, a discharge amount of the processing liquid is small as compared to a case in which only a force caused by capillary action is exerted on the processing liquid in the nozzle block 151.

<4> Control System of Substrate Processing Apparatus 1

Figure 3:
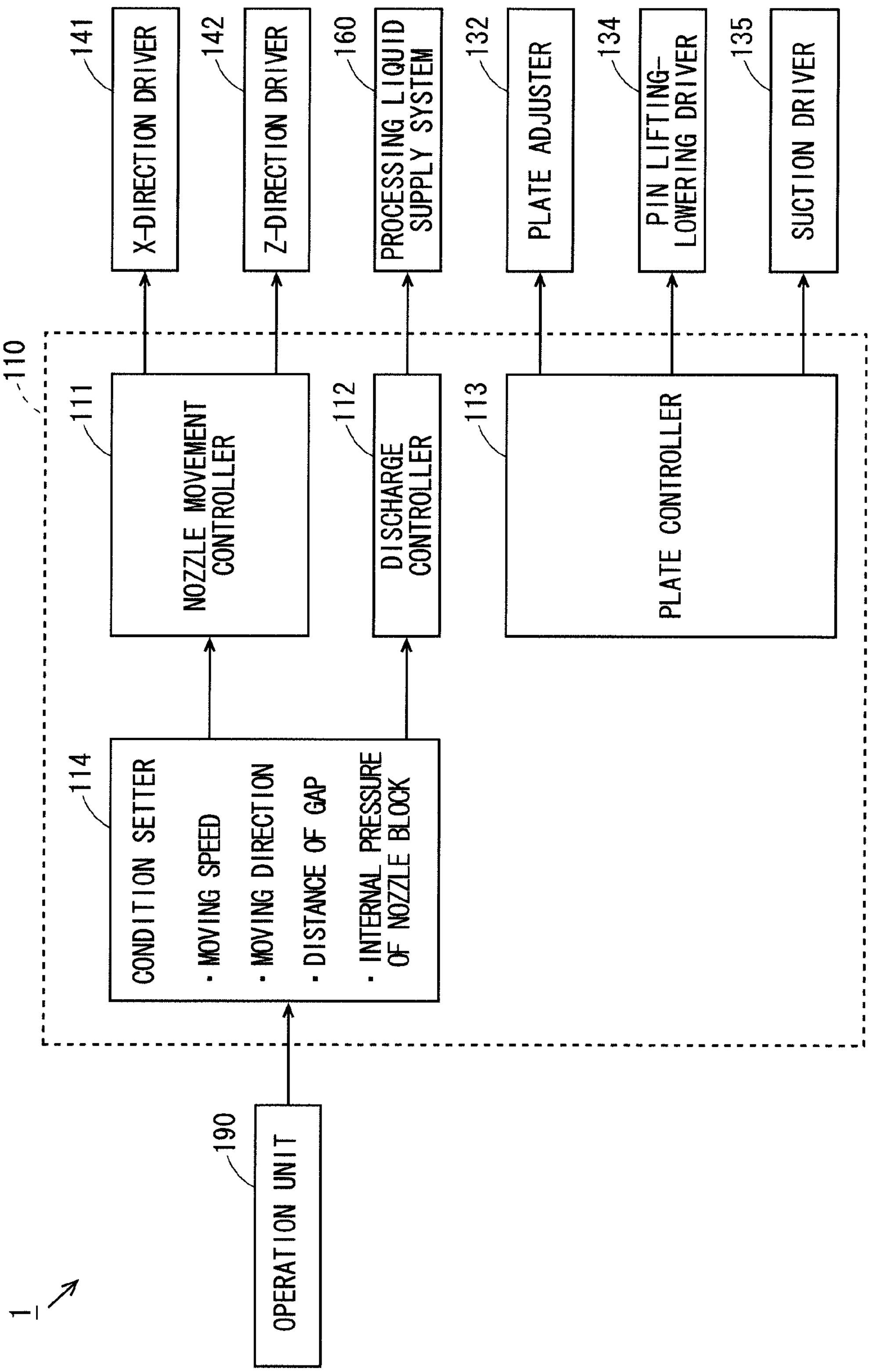
FIG. 3 is a block diagram showing the configuration of a control system of the substrate processing apparatus of FIG. 1.

FIG. 3 is a block diagram showing the configuration of a control system of the substrate processing apparatus 1 of FIG. 1. As described above, the substrate processing apparatus 1 includes the controller 110. The controller 110 includes a CPU (Central Processing Unit), a RAM (Random Access Memory), a ROM (Read Only Memory) and a storage device. The RAM is used as a work area for the CPU. The ROM stores a system program. The storage device stores a coating processing program for performing the coating process on the substrate W.

As shown in FIG. 3, the controller 110 includes a nozzle movement controller 111, a discharge controller 112, a plate controller 113 and a condition setter 114 as functions for controlling the work of the respective components of the substrate processing apparatus 1. The functions of the controller 110 are implemented by execution of the coating processing program stored in the storage device by the CPU. Part or all of the functions of the controller 110 may be implemented by hardware such as an electronic circuit.

The condition setter 114 stores one or a plurality of predetermined process conditions (setting of process conditions). In the present embodiment, the one or plurality of process conditions include "a moving speed of the nozzle block 151" and "a moving direction of the nozzle block 151." Further, the one or plurality of process conditions further include "a length (distance) of the gap between the nozzle block 151 and the substrate W," "an adjustment speed of the length of the gap" and "an internal pressure of the nozzle block 151."

In the following description, the movement of the nozzle block 151 from a position rearward of the coating device 100 to a position forward of the coating device 100 is referred to as forward movement, and the movement of the nozzle block 151 from a position forward of the coating device 100 to a position rearward of the coating device 100 is referred to as rearward movement.

The "moving speed of the nozzle block 151" refers to a moving speed of the nozzle block 151 when the nozzle block 151 is moved in the forward-and-rearward direction of the coating device 100 with respect to the substrate W during the coating process, and the "moving direction of the nozzle block 151" refers to a traveling direction (forward direction or backward direction) of the nozzle block 151 during the coating process. The "adjustment speed of the length of the gap" is a change amount per unit time of the length of the gap between the nozzle block 151 and the substrate W when the length is changed, and is a moving speed of the nozzle block 151 in the upward-and-downward direction with respect to the substrate W in the present embodiment.

The substrate processing apparatus 1 further includes an operation unit 190. The operation unit 190 includes a keyboard and a pointing device, for example, and is configured to be operable by a user. The user can input one or a plurality of process conditions for the coating process by operating the operation unit 190. In a case in which a process condition is input, the condition setter 114 updates a process condition stored in advance with the input process condition (resetting of the process condition).

During the coating process for the substrate W, the nozzle movement controller 111 controls the X-direction driver 141 and the Z-direction driver 142 based on various process conditions set by the condition setter 114. For example, the nozzle movement controller 111 forms a gap having a set length between the nozzle block 151 and the substrate W at a set adjustment speed by controlling the Z-direction driver 142. Further, the nozzle movement controller 111 moves the nozzle block 151 in a set moving direction at a set moving speed by controlling the X-direction driver 141.

During the coating process for the substrate W, the discharge controller 112 controls the valve 161 and the pressure adjuster 163 of the processing liquid supply system 160 based on various process conditions set by the condition setter 114. For example, the discharge controller 112 brings the valve 161 into an open state. Further, the discharge controller 112 adjusts the pressure in the processing liquid tank 162 by controlling the pressure adjuster 163 such that the internal pressure of the nozzle block 151 is a set value.

The plate controller 113 controls the pin lifting-lowering driver 134 and the suction driver 135. Thus, the pin lifting-lowering driver 134 moves the plurality of support pins 133 upwardly and downwardly when the substrate W is carried in and out from the coating device 100, for example. The suction driver 135 holds the substrate W by suction on the plate member 131. Further, the plate controller 113 controls the plate adjuster 132. Thus, the temperature of the substrate platform portion of the plate member 131 is adjusted.

2. Specific Example of Coating Process for Substrate W

In the following description, one end portion of the substrate W placed on the plate member 131, the one end portion being directed rearwardly of the coating device 100, is referred to as a rear end portion of the substrate W. Further, the other end portion of the substrate W placed on the plate member 131, the other end portion being directed forwardly of the coating device 100, is referred to as a front end portion of the substrate W. Further, rearward of the coating device 100 is simply referred to as rearward, and forward of the coating device 100 is simply referred to as forward. Further, the Z direction is referred to as the upward-and-downward direction.

FIGS. 4 to 11 are diagrams for explaining a specific example of the coating process for the substrate W by the coating device 100 of FIG. 1. In FIGS. 4 to 11, the work of the coating device 100 from the start to the end of the coating process is shown in a chronological order. The upper field of each of FIGS. 4 to 11 shows a process condition set corresponding to a point in time shown in the diagram. Further, a side view and a plan view showing the work of the coating device 100 are respectively shown in the middle and lower fields of each diagram. In the plan view in the lower field of each diagram, a virtual line VL extending in the forward-and-rearward direction through a rear end portion wp1, a center portion wp2 and a front end portion wp3 of the substrate W in a plan view is shown in order to facilitate understanding of the positional relationship between the substrate W and the nozzle block 151.

Figure 4:
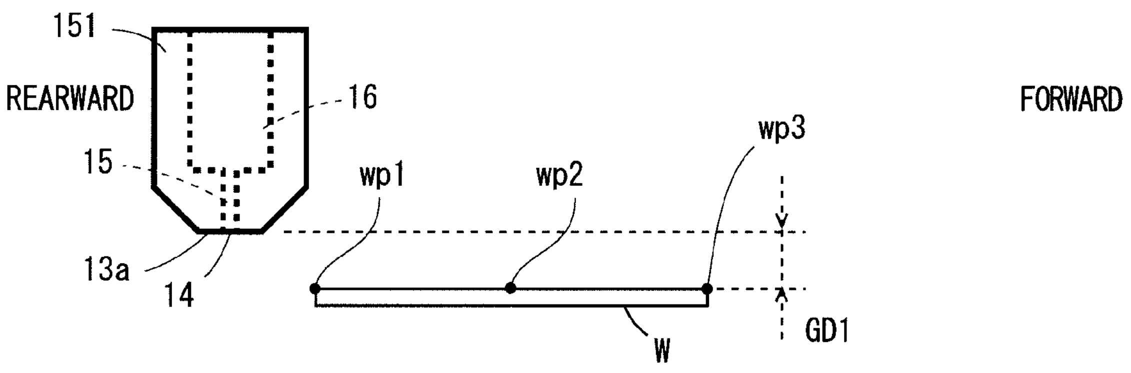
FIG. 4 is a diagram for explaining a specific example of a coating process for a substrate performed by a coating device of FIG. 1.
Figure 4:
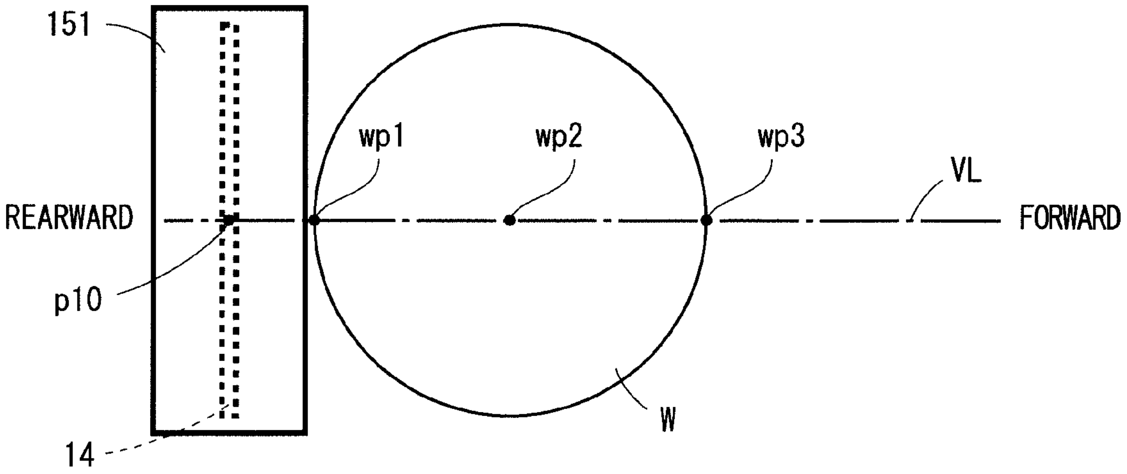
Figure 5:
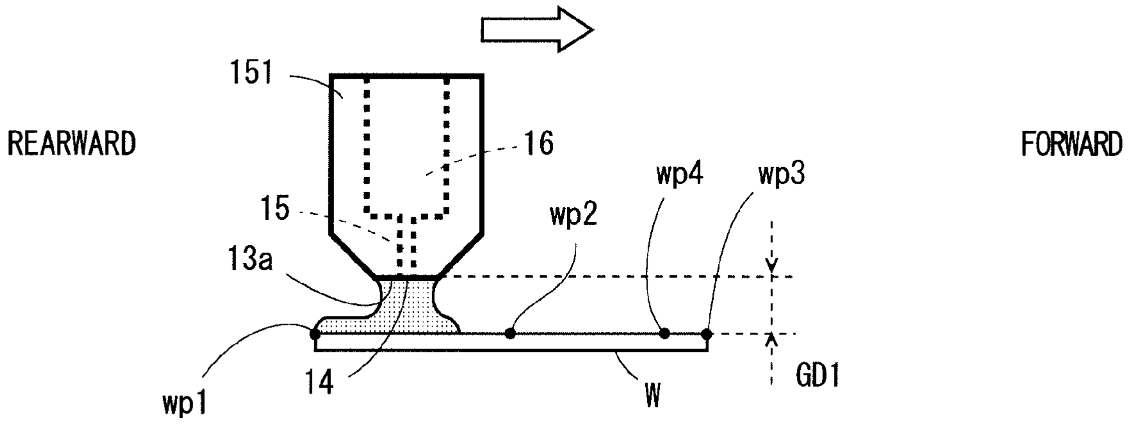
FIG. 5 is a diagram for explaining a specific example of coating process for a substrate performed by a coating device of FIG. 1.
Figure 5:
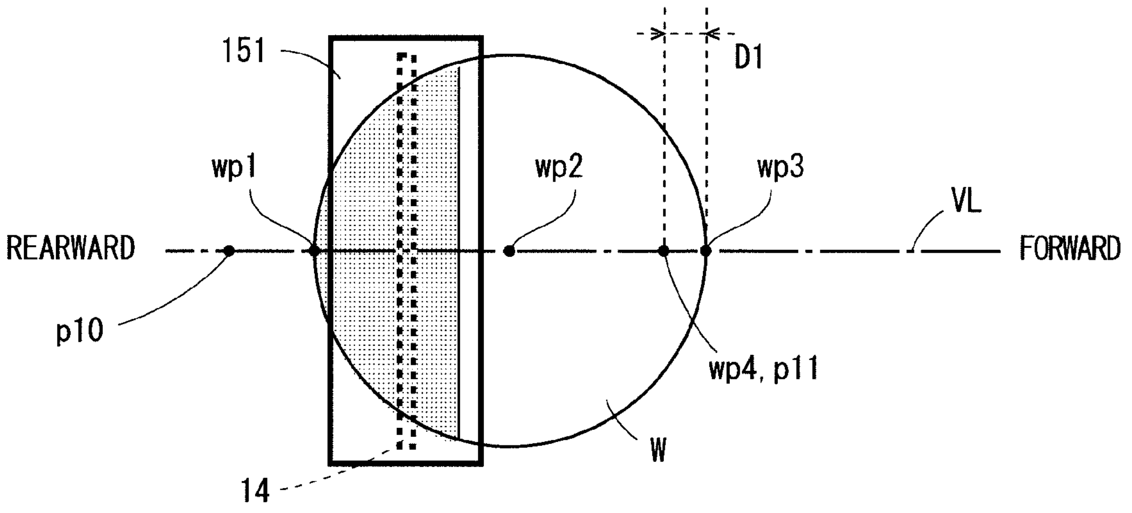
Figure 6:
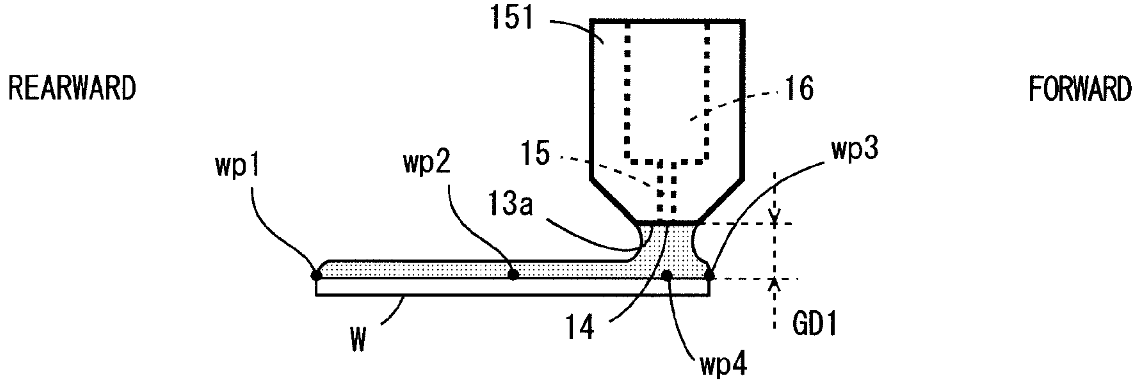
FIG. 6 is a diagram for explaining the specific example of the coating process for a substrate performed by the coating device of FIG. 1.
Figure 6:
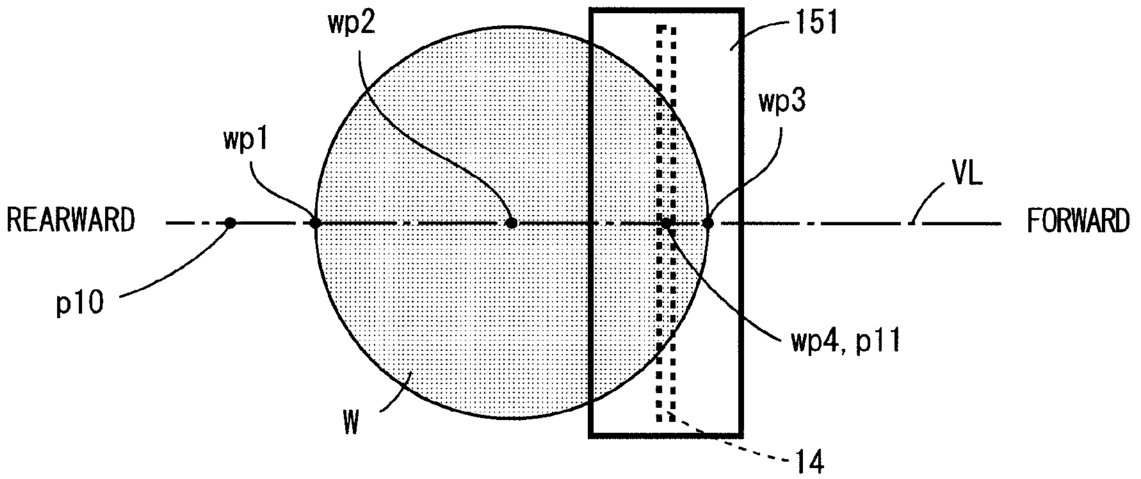

First, as shown in the lower field of FIG. 4, the nozzle block 151 is arranged such that the discharge port 14 is located at an initial position p10 which is in the vicinity of the substrate W and farther rearward than the substrate W in the forward-and-rearward direction. In this state, the length of the gap between the substrate facing surface 13*a* of the nozzle block 151 and the upper surface of the substrate W in the upward-and-downward direction is adjusted to a first length GD1 in accordance with a process condition. The first length GD1 is defined such that the above-mentioned capillary action can occur. The first length GD1 is not less than 5 μm and not more than 500 μm, and is about 70 μm in the present example. Further, the internal pressure of the nozzle block 151 is adjusted to be a first negative pressure (a negative gauge pressure of a first magnitude). The first negative pressure is not less than 500 Pa and not more than 0 Pa, and is about 100 Pa in the present example.

Next, the nozzle block 151 is moved forwardly from the initial position at a predetermined first moving speed. The first moving speed is not less than 1000 μm/sec and not more than 10000 μm/sec, and is about 2500 μm/sec in the present example.

A predetermined amount of the processing liquid is discharged from the discharge port 14 by a pump (not shown) at a point in time at which the discharge port 14 of the nozzle block 151 and a portion in the vicinity of the rear end portion of the substrate W overlap with each other in a plan view. Thus, as shown in the middle field of FIG. 5, the gap between the nozzle block 151 and the substrate W is filled with the processing liquid, capillary action occurs, and the processing liquid in the nozzle block 151 is drawn onto the substrate W. The nozzle block 151 is moved forwardly at the first moving speed, so that a film of the processing liquid is continuously formed in a portion of the upper surface of the substrate W through which the nozzle block 151 passes in a plan view.

Here, in the substrate W, a predetermined portion which is close to the front end portion wp3 of the substrate W and is located in the peripheral portion of the substrate W is referred to as a peripheral stop portion wp4. As shown in the lower field of FIG. 5, the peripheral stop portion wp4 is located on the virtual line VL. The peripheral stop portion wp4 may be located farther forwardly than the front end portion wp3 or may be located farther rearwardly than the front end portion wp3. Here, in a case in which the peripheral stop portion wp4 is located farther forwardly than the front end portion wp3, the distance D1 between the peripheral stop portion wp4 and the front end portion wp3 in the forward-and-rearward direction is indicated with a negative value. Further, in a case in which the peripheral stop portion wp4 is located farther rearwardly than the front end portion wp3, the above-mentioned distance D1 is indicated with a positive value. In this case, the distance D1 is not less than −1 mm and not more than 5 mm, and is about 1 mm in the present example.

The above-mentioned forward movement of the nozzle block 151 continues until the discharge port 14 is at a position p11 that overlaps with the peripheral stop portion wp4 in a plan view (hereinafter referred to as a first position). When the nozzle block 151 reaches the first position p11, the forward moving speed of the nozzle block 151 changes from the first moving speed to 0 as shown in the upper field of FIG. 6. Thus, the nozzle block 151 is temporarily stopped. At this point in time, a film of the processing liquid is formed on the entire upper surface of the substrate W.

Figure 7:
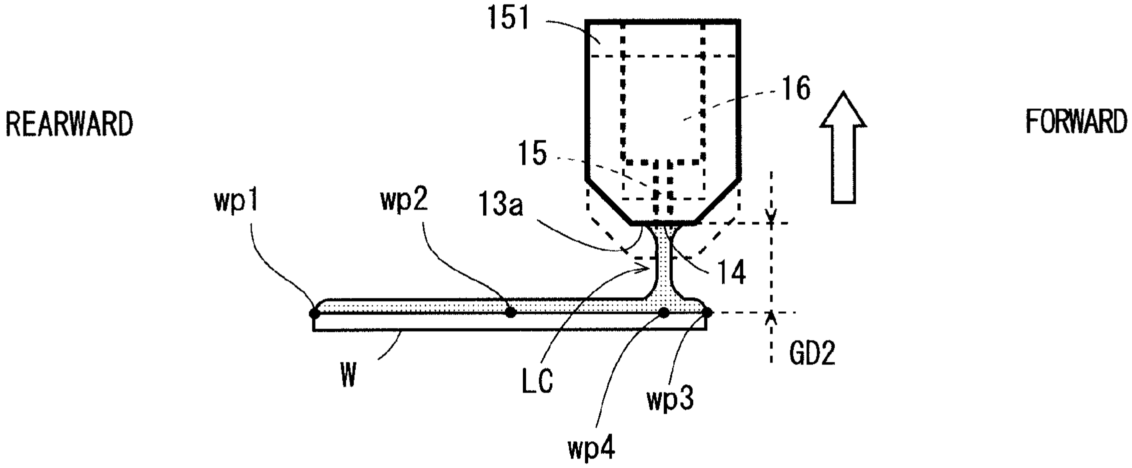
FIG. 7 is a diagram for explaining the specific example of the coating process for a substrate performed by the coating device of FIG. 1.
Figure 7:
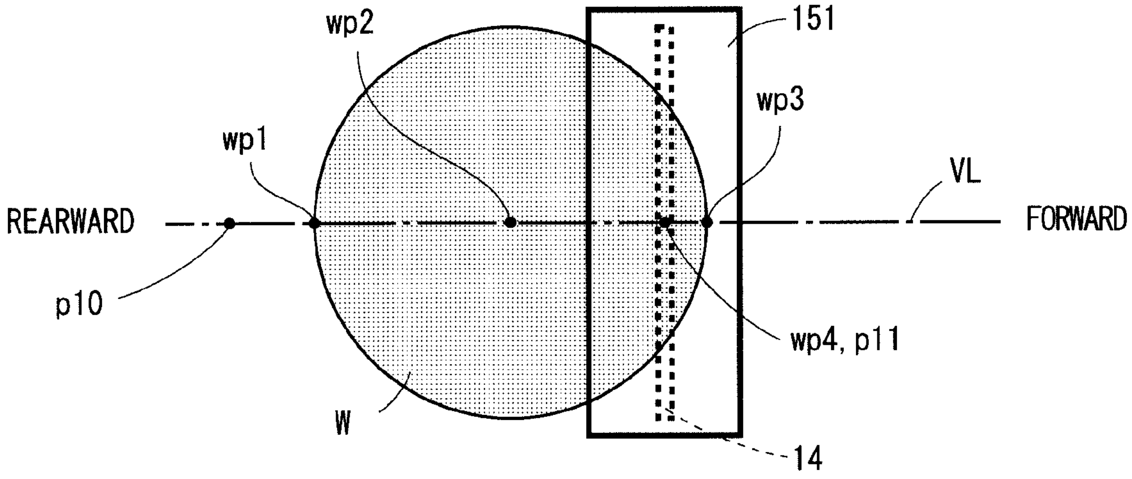

Next, as shown in the upper and middle fields of FIG. 7, the nozzle block 151 is lifted at a preset first adjustment speed. Thus, the length of the gap between the substrate facing surface 13*a* of the nozzle block 151 and the upper surface of the substrate W in the upward-and-downward direction is adjusted from the first length GD1 to a second length GD2. The first adjustment speed is not less than 10 μm/sec and not more than 1000 μm/sec, and is about 50 μm/sec in the present example. The second length GD2 is larger than the first length GD1 and is not less than 10 μm and not more than 2000 μm, and is about 300 μm in the present example.

As described above, the work for adjusting the length of the gap is performed to form a liquid column LC between the nozzle block 151 and the substrate W, the liquid column LC connecting the processing liquid adhering to the substrate facing surface 13*a* of the nozzle block 151 to the processing liquid on the substrate W. Therefore, the first adjustment speed and the second length GD2, described above, are determined in consideration of the relationship among the physical properties of the outer surface of the lower end portion of the nozzle blocks 151, the physical properties of the processing liquid and the like such that the connection between the nozzle block 151 and the substrate W by the processing liquid is not completely cut off. The first adjustment speed and the second length GD2 may be determined by an experiment or simulation.

Further, the internal pressure of the nozzle block 151 is adjusted from the first negative pressure to a second negative pressure (a negative gauge pressure of a second magnitude larger than the first magnitude) lower than the first negative pressure. The second negative pressure is not less than 500 Pa and not more than 0 Pa, and is about 100 Pa in the present example. In this manner, the work for adjusting the internal pressure of the nozzle block 151 is performed such that part of the liquid column LC formed between the nozzle block 151 and the substrate W is sucked into the nozzle block 151 and the transverse section of the liquid column LC is reduced. The transverse section of the liquid column LC is a cross section of the liquid column LC taken along a plane (horizontal plane in the present example) orthogonal to the direction in which the liquid column LC extends.

When the internal pressure of the nozzle block 151 is set to the second negative pressure, part of the excess processing liquid applied to the peripheral stop portion wp4 and its peripheral portions on the substrate W is also sucked into the nozzle block 151 from the discharge port 14 through the liquid column LC. Further, part of the excess processing liquid adhering to the rear inclined surface 13*c* of the nozzle block 151 is also sucked into the nozzle block 151 from the discharge port 14.

However, similarly to the first adjustment speed and the second length GD2, the second negative pressure is determined in consideration of the relationship among the physical properties of the outer surface of the lower end portion of the nozzle block 151, the physical properties of the processing liquid and the like such that the connection between the nozzle block 151 and the substrate W by the processing liquid is not completely cut off. The second negative pressure may be defined by an experiment or simulation.

Figure 8:
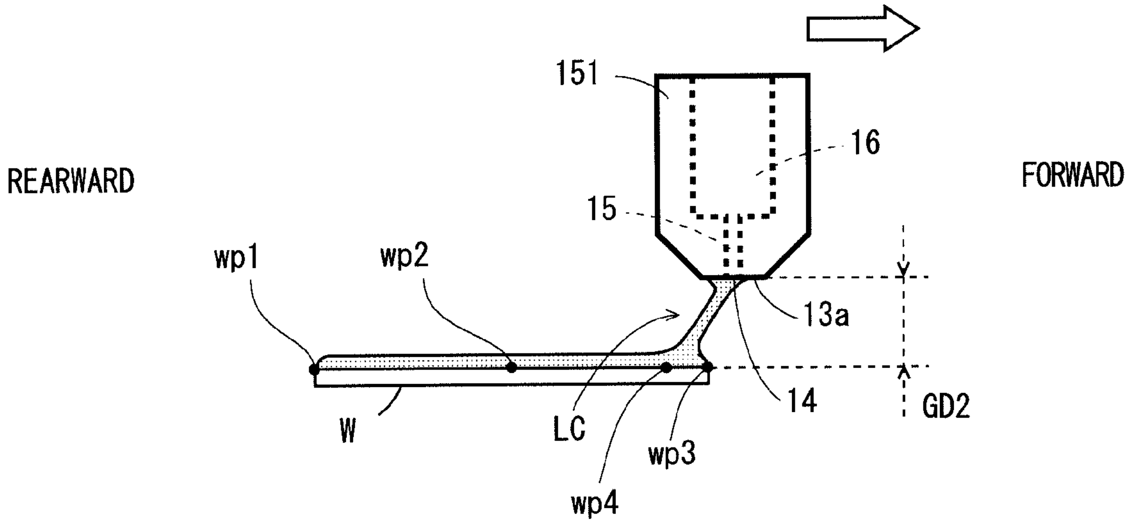
FIG. 8 is a diagram for explaining the specific example of the coating process for a substrate performed by the coating device of FIG. 1.
Figure 8:
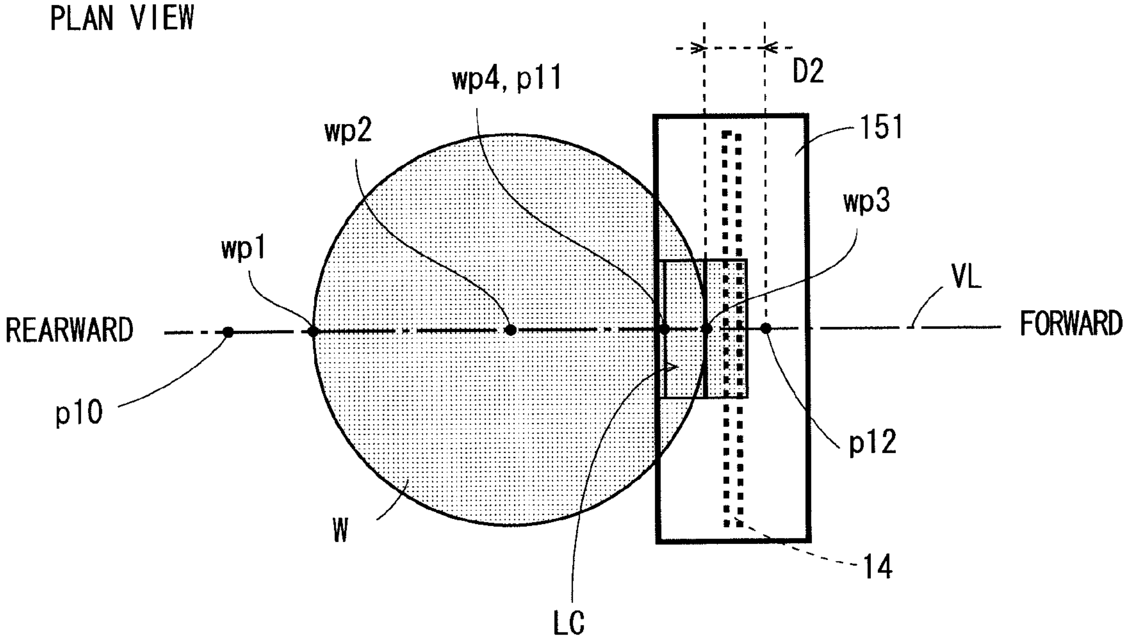

Next, as shown in the upper field of FIG. 8, the internal pressure of the nozzle block 151 is changed back from the second negative pressure to the first negative pressure. Further, as shown in the middle and lower fields of FIG. 8, the nozzle block 151 is moved forwardly from the first position p11 toward a second position p12 farther forward than the substrate W at the first moving speed. In a case in which the distance of a portion in an area farther forward than the front end portion wp3 is indicated with a positive value, a distance D2 between the front end portion wp3 of the substrate W and the second position p12 in the forward-and-rearward direction is not less than 0 mm and not more than 5 mm, and is about 0 mm in the present example.

In a period during which the nozzle block 151 is moved forwardly from the first position p11 to the second position p12, the larger the distance between the nozzle block 151 and the substrate W, the smaller the cross section of the liquid column LC. Further, the processing liquid in the upper end portion of the liquid column LC adhering to the substrate facing surface 13*a* of the nozzle block 151 is moved rearwardly on the substrate facing surface 13*a*.

Figure 9:
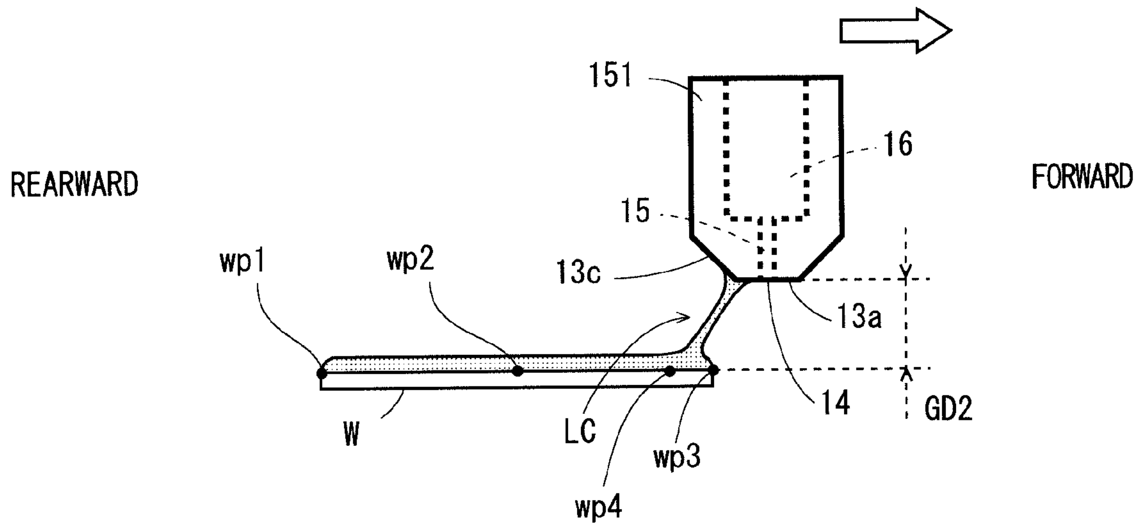
FIG. 9 is a diagram for explaining the specific example of the coating process for a substrate performed by the coating device of FIG. 1.
Figure 9:
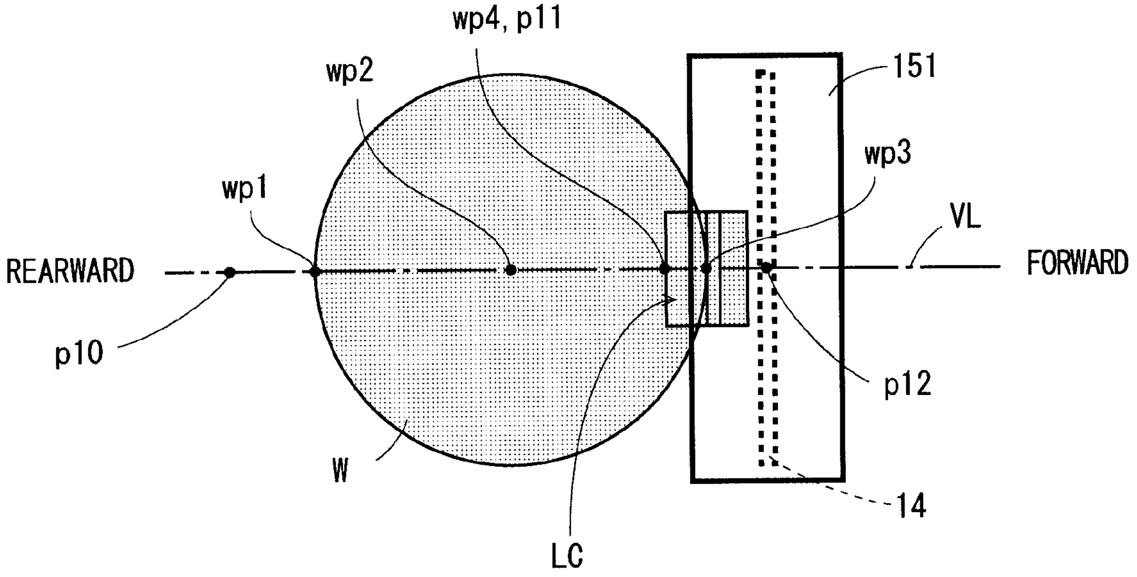

As a result, when the nozzle block 151 reaches the second position p12, the processing liquid in the upper end portion of the liquid column LC is moved to a position spaced apart rearwardly from the discharge port 14 on the substrate facing surface 13*a* of the nozzle block 151, as shown in the middle field of FIG. 9. Further, in this case, the connection portion between the processing liquid applied onto the substrate W and the liquid column LC approaches the front end portion wp3 of the substrate W from the peripheral stop portion wp4 of the substrate W.

In this manner, in the present example, in a period during which the nozzle block 151 is moved forwardly from the first position p11 to the second position p12, the liquid column LC changes from a liquid contact state in which the liquid column LC is in contact with the processing liquid in the discharge port 14 to a liquid non-contact state in which the liquid column LC is not in contact with the processing liquid in the discharge port 14.

Figure 10:
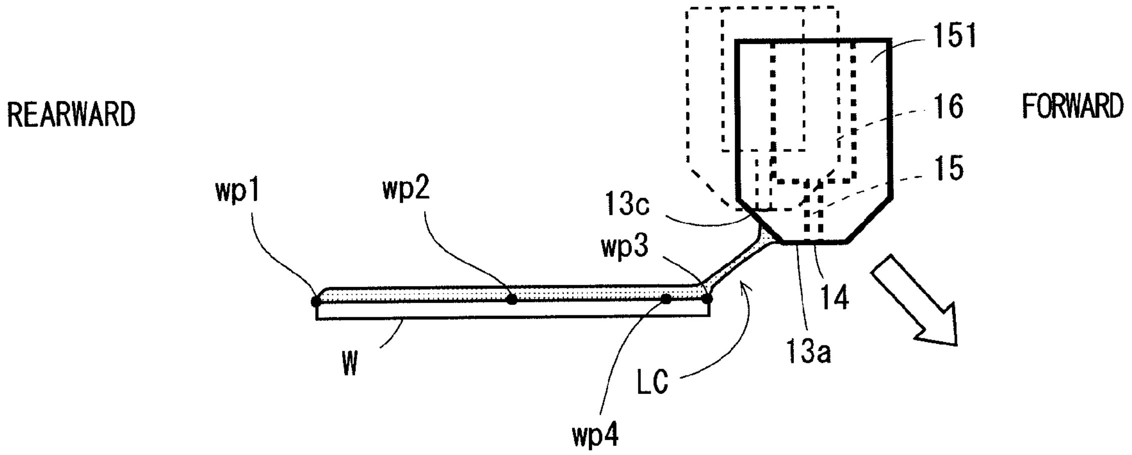
FIG. 10 is a diagram for explaining the specific example of the coating process for a substrate performed by the coating device of FIG. 1.
Figure 10:
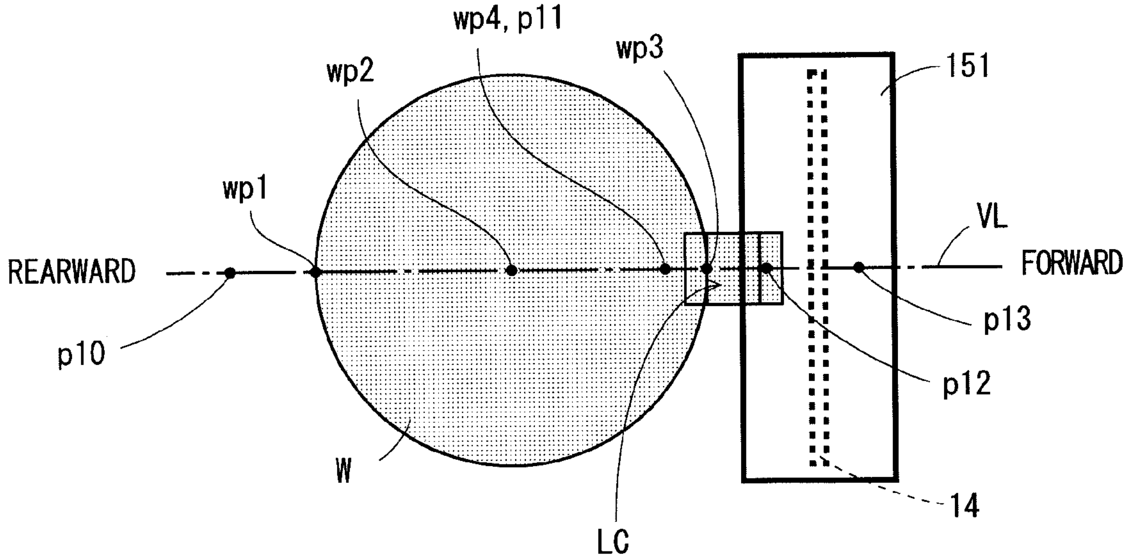
Figure 11:
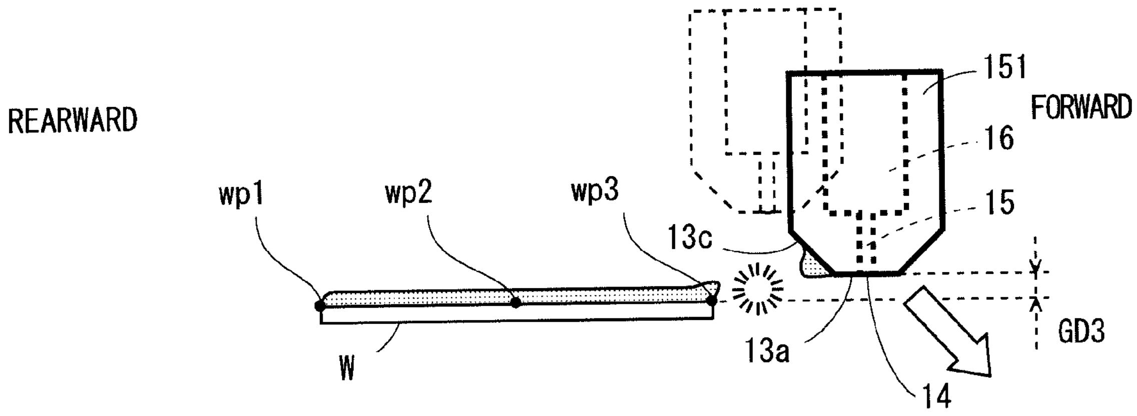
FIG. 11 is a diagram for explaining the specific example of the coating process for a substrate performed by the coating device of FIG. 1.
Figure 11:
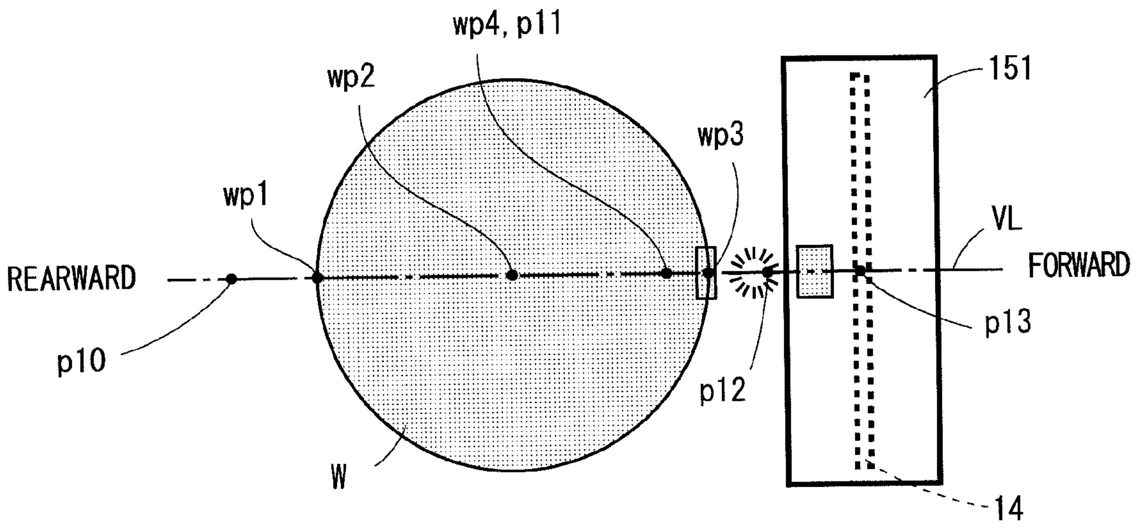

Next, as shown in each of the upper and middle fields of FIGS. 10 and 11, the nozzle block 151 is lowered at a preset second adjustment speed. Thus, the length of the gap between the substrate facing surface 13*a* of the nozzle block 151 and the upper surface of the substrate W in the upward-and-downward direction is adjusted from the second length GD2 to a third length GD3 (FIG. 11).

The magnitude of the second adjustment speed may be the same as that of the first adjustment speed, or may be larger than that of the first adjustment speed. The second adjustment speed is not less than 5 μm/sec and not more than 500 μm/sec, and is about 50 μm/sec in the present example. The third length GD3 is smaller than the first length GD1 and the second length GD2. In a case in which the distance of a portion in an area farther downward than the upper surface of the substrate W is indicated by a negative value, and the distance of a portion in an area farther upward than the upper surface of the substrate W is indicated by a positive value, the third length GD3 is not less than—1000 μm and not more than 70 μm, and is about 70 μm in the present example.

Further, in a period during which the length of the gap between the nozzle block 151 and the substrate W in the upward-and-downward is adjusted, the nozzle block 151 is moved forwardly at the second moving speed toward a third position p13 farther forward than the second position p12. The second moving speed is higher than the first moving speed, is not less than 1000 μm/sec and not more than 10000 μm/sec, and is about 2500 μm/sec in the present example.

Here, with the nozzle block 151 at the second position p12, the liquid column LC has a small cross section as compared to a state in which the nozzle block 151 is at the first position p11 (FIG. 7), and is likely to some extent to break apart. In the present example, the nozzle block 151 is moved forwardly and obliquely downwardly at a high speed after reaching the second position p12. Thus, as shown in each of the middle and lower fields of FIG. 11, the liquid column LC breaks apart in a period during which the nozzle block 151 is moved forwardly from the second position p12 to the third position p13. Thus, the coating process for the substrate W is completed.

3. Effects

In the above-mentioned coating process, the internal pressure of the nozzle block 151 is first adjusted to the first negative pressure while the first length GD1 is formed between the nozzle block 151 and the upper surface of the substrate W. In this state, the nozzle block 151 is moved forwardly from the initial position p10 to the first position p11 (see FIGS. 4 to 6). At this time, the processing liquid drawn out from the discharge port 14 is applied to the upper surface of the substrate by capillary action exerted on the processing liquid in the gap between the nozzle block 151 and the substrate W. In this case, the processing liquid in the nozzle block 151 is not discharged from the discharge port with capillary action not exerted. Therefore, wasteful consumption of the processing liquid is suppressed.

With the nozzle block 151 at the first position p11, the length of the gap between the nozzle block 151 and the substrate W is adjusted to the second length GD2 larger than the first length GD1. Thus, the liquid column LC is formed between the processing liquid adhering to the outer surface of the lower end portion of the nozzle block 151 and the processing liquid applied onto the substrate W.

Further, the internal pressure of the nozzle block 151 is adjusted to the second negative pressure lower than the first negative pressure. Thus, an excess portion of the processing liquid applied to the peripheral stop portion wp4 and its peripheral portions of the substrate W is sucked into the nozzle block 151 from the discharge port 14 through the liquid column LC. Further, an excess portion of the processing liquid adhering to the outer surface of the lower end portion of the nozzle block 151 is sucked into the nozzle block 151 from the discharge port 14. Further, part of the liquid column LC is sucked into the nozzle block 151 from the discharge port 14, and the cross section of the liquid column LC is reduced (see FIGS. 6 and 7).

When the liquid column LC breaks apart in the liquid contact state, the processing liquid in the nozzle block 151 may be excessively drawn out from the discharge port 14 onto the substrate W depending on the relationship among the gap between the nozzle block 151 and the substrate W, the physical properties of the outer surface of the lower end portion of the nozzle block 151, the physical properties of the processing liquid, and the like.

In contrast, in the above-mentioned specific example of the coating process, in a period during which the nozzle block 151 is moved forwardly from the first position p11 to the second position p12, the liquid column LC changes from the liquid contact state to the liquid non-contact state without breaking apart (see FIGS. 8 and 9). Therefore, even when the liquid column LC breaks apart after the nozzle block 151 reaches the second position p12, the processing liquid in the nozzle block 151 is not excessively drawn out from the discharge port 14 onto the substrate processing apparatus 1 at the time of breaking. Further, as described above, before the nozzle block 151 starts to be moved forwardly from the first position p11 to the second position p12, the size of the cross section of the liquid column LC is reduced to some extent. Therefore, even in a case in which part of the liquid column LC flows onto the substrate W when the liquid column LC breaks apart, a flow rate is reduced. Therefore, local thickening of a film of the processing liquid on the upper surface of the substrate W is reduced.

Further, the nozzle block 151 is moved forwardly so as to be directed obliquely downwardly from the second position p12. In this case, the connection portion between the processing liquid on the substrate W and the liquid column LC can be brought closer to the front end portion wp3 from the peripheral stop portion wp4 of the substrate W. Therefore, even in a case in which part of the liquid column LC flows onto the substrate W when the liquid column LC breaks apart, a portion where the film of the processing liquid is locally thickened due to breaking is limited to an area extremely close to the front end portion wp3 (see FIGS. 10 and 11). That is, even in a case in which being generated in the vicinity of the outer peripheral end of the substrate W, the portion the thickness of which changes due to breaking of the liquid column LC can be excluded from a process subject area (a chip formation area, for example) on the substrate W.

Further, when the nozzle block 151 is moved forwardly and obliquely downwardly from the second position p12, the moving speed is increased. Thus, the liquid column LC breaks apart at a desired point in time. Therefore, generation of variations in thickness of the film of the processing liquid formed on the substrate W due to breaking of the liquid column LC at an unintended point in time is prevented.

As a result, it is possible to make the thickness of the film of the processing liquid applied onto the substrate W be uniform while suppressing wasteful consumption of the processing liquid.

4. Other Embodiments (a) In the coating process for the substrate W according to the above-mentioned embodiment, when the nozzle block 151 is moved forwardly, the liquid column LC formed between the nozzle block 151 and the substrate W is required to change from the liquid contact state to the liquid non-contact state. Thus, it is possible to make the thickness of the film of the processing liquid applied onto the substrate W be uniform while suppressing wasteful consumption of the processing liquid.

In view of this point, in a case in which the liquid column LC changes from the liquid contact state to the liquid non-contact state during the forward movement of the nozzle block 151, the length of the gap between the nozzle block 151 and the substrate W does not have to be changed from the first length GD1 to the second length GD2 at the first position p11. Alternatively, in a case in which the liquid column LC changes from the liquid contact state to the liquid non-contact state during the forward movement of the nozzle block 151, the internal pressure of the nozzle block 151 does not have to be changed from the first negative pressure to the second negative pressure at the first position p11.

(b) In the coating process for the substrate W according to the above-mentioned embodiment, when the nozzle block 151 is moved forwardly, the cross section of the liquid column LC formed between the nozzle block 151 and the substrate W is required to be reduced as much as possible. Thus, it is possible to make the thickness of the film of the processing liquid applied onto the substrate W be uniform while suppressing wasteful consumption of the processing liquid.

In view of this point, in a case in which the cross section of the liquid column LC is sufficiently reduced because the length of the gap between the nozzle block 151 and the substrate W is adjusted to the second length GD2 at the first position p11 and the internal pressure of the nozzle block 151 is changed from the first negative pressure to the second negative pressure, the liquid column LC does not have to be changed from the liquid contact state to the liquid non-contact state.

(c) In the coating process for the substrate W according to the above-mentioned embodiment, when the length of the gap between the nozzle block 151 and the substrate W is adjusted to the second length GD2 at the first position p11, the internal pressure of the nozzle block 151 is maintained at the second negative pressure. Thereafter, when the nozzle block 151 is moved forwardly, the internal pressure of the nozzle block 151 is changed back from the second negative pressure to the first negative pressure. However, the present disclosure is not limited to this.

The internal pressure of the nozzle block 151 may be maintained at the second negative pressure in a period during which the nozzle block 151 is moved forwardly from the first position p11 to the second position p12. Alternatively, the internal pressure of the nozzle block 151 may be maintained at the second negative pressure in a period during which the nozzle block 151 is moved forwardly from the first position p11 to the third position p13.

(d) In the coating process for the substrate W according to the above-mentioned embodiment, the nozzle block 151 may be held at the first position p11 for a predetermined period of time while the length of the gap between the nozzle block 151 and the substrate W is adjusted to the second length GD2. That is, the work of the nozzle block 151 may be stopped for the predetermined period of time with the length of the gap between the nozzle block 151 and the substrate W adjusted to the second length GD2 at the first position p11. In this case, the predetermined period of time is equal to or shorter than 10 sec, for example. Thus, the cross section of the liquid column LC formed between the nozzle block 151 and the substrate W can be sufficiently reduced.

(e) In the coating process for the substrate W according to the above-mentioned embodiment, the nozzle block 151 is moved forwardly from the initial position p10 to the first position p11 at the first moving speed, and is moved forwardly from the first position p11 to the second position p12 at the first moving speed. However, the present disclosure is not limited to this. The nozzle block 151 may be moved forwardly from the first position p11 to the second position p12 at a moving speed different from the first moving speed and lower than the second moving speed.

(f) While the processing liquid is applied to the entire upper surface of the substrate W in the coating device 100 according to the above-mentioned embodiment, the present disclosure is not limited to this. A film of the processing liquid may be formed only in a partial area of the upper surface of the substrate W.

(g) While a film of the processing liquid is formed on the substrate W by movement of the nozzle device 150 in the forward-and-rearward direction with respect to the substrate W on the fixed plate member 131 in the above-mentioned embodiment, the present disclosure is not limited to this.

The coating device 100 may be configured such that the plate member 131 is movable in the forward-and-rearward direction. In this case, a film of the processing liquid may be formed on the substrate W placed on the plate member 131 by movement of the plate member 131 in the forward-and-rearward direction with respect to the fixed nozzle device 150. Alternatively, a film of the processing liquid may be formed on the substrate W placed on the plate member 131 by forward movement (or rearward movement) of the nozzle device 150 and rearward movement (or forward movement) of the plate member 131.

(h) The internal pressure of the nozzle block 151 is adjusted from the first negative pressure to the second negative pressure lower than the first negative pressure when the nozzle block 151 reaches the first position p11 and is lifted in the above-mentioned embodiment, the present disclosure is not limited to this. The second negative pressure may be higher than the first negative pressure.

In this case, an atmosphere outside of the nozzle block 151 is prevented from being drawn into the nozzle block 151 from the discharge port 14 due to elimination of capillary action that occurs in the gap between the nozzle block 151 and the substrate W. This prevents air bubbles from being mixed in the processing liquid in the nozzle block 151.

(i) While the processing liquid is supplied onto the substrate W from the nozzle block 151 with utilization of capillary action that occurs in the gap between the nozzle block 151 and the substrate W in the substrate processing apparatus 1 according to the above-mentioned embodiment, the present disclosure is not limited to this.

For example, the substrate processing apparatus 1 may be configured to supply the processing liquid onto the substrate W from the discharge port 14 of the nozzle block 151 without utilizing an occurrence of capillary action. In this case, when the processing liquid is supplied from the nozzle block 151 to the substrate W, the distance between the nozzle block 151 and the substrate W can be increased to such an extent that capillary action does not occur.

As described above, in a case in which capillary action is not utilized, the processing liquid is supplied from the nozzle block 151 to the substrate W by adjustment (an increase) of the pressure of the processing liquid in the nozzle block 151. Further, in this case, it is preferable to adjust an opening area of the slit-like discharge port 14 in accordance with the width of the substrate W during movement of the nozzle block 151 with respect to the substrate W. In this manner, a portion of the slit-like discharge port 14 that is not opposite to the substrate W is suitably closed. This prevents the processing liquid from being discharged to an area where the substrate W is not present, so that wasteful consumption of the processing liquid is prevented.

5. Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. As each of various elements recited in the claims, various other elements having configurations or functions described in the claims can be also used.

In the above-mentioned embodiment, the substrate processing apparatus 1 is an example of a substrate processing apparatus, the stage device 130 is an example of a substrate holder, the discharge port 14 is an example of a discharge port, the nozzle block 151 is an example of a nozzle, the lower end portion of the nozzle block 151 is an example of a nozzle tip portion, the Y direction is an example of a longitudinal direction of a discharge port, and the X direction and the forward-and-rearward direction of the coating device 100 are examples of a lateral direction of the discharge port.

Further, the two nozzle supports 140 and the X-direction driver 141 are examples of a mover, the controller 110 is an example of a controller, the first length GD1 is an example of a predetermined length, the second length GD2 is an example of a length larger than the predetermined length, and movement of the nozzle block 151 from the initial position p10 to the first position p11 is an example of a first moving work.

Further, the liquid column LC is an example of a liquid column, movement of the nozzle block 151 from the first position p11 to the second position p12 is an example of a second moving work, the peripheral stop portion wp4 of the substrate W is an example of a predetermined portion of a peripheral portion of the substrate, the first position p11 is an example of a first position, the second position p12 is an example of a second position, the two nozzle supports 140 and the Z-direction driver 142 are examples of a lifter-lowerer, and the pressure adjuster 163 of the processing liquid supply system 160 is an example of a pressure adjuster.

Further, the first negative pressure is an example of a first negative pressure, the first moving speed is an example of a first speed and a second speed, and the second moving speed is an example of a third speed. Further, the second negative pressure described in the part except for the item (h) in the other embodiments is an example of a second negative pressure, and the second negative pressure described in the item (h) in the other embodiments is an example of a second negative pressure.

6. Overview of Embodiments (Item 1) A substrate processing apparatus according to item 1 that forms a film of a processing liquid on an upper surface of a substrate at least partially having a circular outer periphery, includes a substrate holder that holds the substrate, a nozzle having a nozzle tip portion in which a slit-like discharge port extending in one direction is formed, a mover that relatively moves at least one of the substrate and the nozzle with respect to another one in a lateral direction that intersects with a longitudinal direction of the discharge port, and a controller that controls the mover, and the controller causes the mover to perform a first moving work for relatively moving the substrate and the nozzle in the lateral direction while supplying the processing liquid onto the upper surface of the substrate from the discharge port, with a gap that is equal to or smaller than a predetermined length formed between the nozzle tip portion and the substrate and with the gap filled with the processing liquid, and a second moving work for further relatively moving the substrate and the nozzle in the lateral direction such that a liquid column connecting the processing liquid present on the upper surface of the substrate to the processing liquid adhering to an outer surface of the nozzle tip portion changes from a liquid contact state in which the liquid column is in contact to the processing liquid present in the discharge port and a non-contact state in which the liquid column is not in contact with the processing liquid present in the discharge port after the first moving work.

In the substrate processing apparatus, the processing liquid is applied onto the upper surface of the substrate with use of the nozzle having the slit-like discharge port during the first moving work. Therefore, wasteful consumption of the processing liquid is suppressed.

At a point in time at which the first moving work ends, the gap between the nozzle tip portion and the substrate is filled with the processing liquid. When the distance between the nozzle tip portion and the substrate increases, a liquid column is formed between the processing liquid adhering to the outer surface of the nozzle tip portion and the processing liquid applied onto the substrate. When the liquid column breaks apart in the liquid contact state, the processing liquid in the nozzle may be excessively drawn out from the discharge port onto the substrate depending on the relationship among the gap between the nozzle tip portion and the substrate, the physical properties of the outer surface of the nozzle tip portion, the surface tension of the processing liquid, and the like.

In contrast, with the above-mentioned configuration, during the second moving work, the liquid column changes from the liquid contact state to the liquid non-contact state without breaking apart. Therefore, even when the liquid column breaks apart after the second moving work, the processing liquid in the nozzle is not excessively drawn out from the discharge port onto the substrate at the time of breaking. Therefore, local thickening of the film of the processing liquid on the upper surface of the substrate is reduced.

As a result, it is possible to make the thickness of the film of the processing liquid applied onto the substrate be uniform while suppressing wasteful consumption of the processing liquid.

(Item 2) The substrate processing apparatus according to item 1, wherein supply of the processing liquid onto the upper surface of the substrate in the first moving work may include drawing out the processing liquid in the nozzle from the discharge port onto the upper surface of the substrate by causing capillary action to occur in the gap.

In this case, during the first moving work, the processing liquid drawn out from the slit-like discharge port is applied to the upper surface of the substrate by capillary action exerted on the processing liquid in the gap between the nozzle tip portion and the substrate. Therefore, the nozzle can be configured such that the processing liquid in the nozzle is not discharged from the discharge port with capillary action not exerted.

(Item 3) The substrate processing apparatus according to item 1 or 2, wherein the discharge port of the nozzle may pass through an at least partial area of the substrate in a plan view and may move to a first position overlapping with a predetermined portion in a peripheral portion of the substrate due to the first moving work, and may move from the first position to a second position not overlapping with the substrate in a plan view due to the second moving work.

In this case, local thickening of the film of the processing liquid applied to the peripheral portion of the substrate is reduced.

(Item 4) The substrate processing apparatus according to any one of items 1 to 3, may further include a lifter-lowerer that changes a length of a gap between the nozzle tip portion and the substrate in an upward-and-downward direction by moving at least one of the substrate held by the substrate holder and the nozzle with respect to another one in the upward-and-downward direction, wherein the controller, by controlling the lifter-lowerer, may maintain the length of the gap between the nozzle tip portion and the substrate to a length equal to or smaller than the predetermined length during the first moving work, may change the length of the gap between the nozzle tip portion and the substrate to a length larger than the predetermined length after the first moving work ends and before the second moving work is started, and may maintain the length of the gap between the nozzle tip portion and the substrate larger than the predetermined length during the second moving work.

In this case, the gap between the nozzle tip portion and the substrate increases after the first moving work ends and before the second moving work is started. Thus, a liquid column is formed between the processing liquid adhering to the outer surface of the nozzle tip portion and the processing liquid applied onto the substrate.

The liquid column is stretched as the length of the gap between the nozzle tip portion and the substrate increases. Thus, the cross section of the liquid column connecting the nozzle tip portion to the substrate is reduced. Therefore, even in a case in which part of the liquid column flows onto the substrate when the liquid column breaks apart between the nozzle tip portion and the substrate, a flow rate is reduced. Therefore, local thickening of the film of the processing liquid on the upper surface of the substrate is reduced.

Here, the pressure of the processing liquid in the nozzle may be adjusted to be low after the first moving work ends and before the second moving work is started. In this case, an excess portion of the processing liquid applied to the predetermined portion in the peripheral portion of the substrate and its vicinity is sucked into the nozzle from the discharge port through the liquid column, and the cross section of the liquid column connecting the nozzle tip portion to the substrate is more sufficiently reduced. Therefore, even in a case in which part of the liquid column flows onto the substrate when the liquid column breaks apart between the nozzle tip portion and the substrate, a flow rate is reduced. Therefore, local thickening of the film of the processing liquid on the upper surface of the substrate is reduced.

(Item 5) The substrate processing device according to item 4, may further include a pressure adjuster that adjusts a pressure of the processing liquid in the nozzle, wherein the controller, by controlling the pressure adjuster, may adjust the pressure of the processing liquid in the nozzle to a predetermined first negative pressure during the first moving work, and may adjust the pressure of the processing liquid in the nozzle to a second negative pressure higher than the first negative pressure after the first moving work ends and before the second moving work is started.

In this case, the pressure of the processing liquid in the nozzle during the first moving work is adjusted to the first negative pressure. This prevents the processing liquid from leaking from the discharge port without an occurrence of capillary action, and prevents an excessive amount of the processing liquid from leaking from the discharge port.

Further, with the above-mentioned configuration, after the end of the first moving work and before the start of the second moving work, the liquid column is formed between the nozzle tip portion and the substrate, and the pressure of the processing liquid in the nozzle is adjusted to the second negative pressure. This prevents an atmosphere outside of the nozzle from being drawn into the nozzle through the discharge port due to elimination of capillary action that occurs between the nozzle tip portion and the substrate. This prevents air bubbles from being mixed in the processing liquid in the nozzle.

(Item 6) The substrate processing apparatus according to item 4 or 5, wherein the controller, by controlling the mover and the lifter-lowerer, may move the nozzle tip portion relatively, obliquely downwardly and outwardly of the substrate in a side view in which the discharge port is viewed in a longitudinal direction after the second moving work.

In this case, the connection portion between the processing liquid on the substrate and the liquid column can be brought closer to a portion closer to the outer peripheral end of the substrate from the predetermined portion in the peripheral portion of the substrate. Therefore, even in a case in which part of the liquid column flows onto the substrate when the liquid column LC breaks apart between the nozzle tip portion and the substrate, a portion where the film of the processing liquid is locally thickened due to breaking is limited to a position extremely close to the outer peripheral end of the substrate.

(Item 7) The substrate processing apparatus according to item 6, wherein in a case in which a moving speed at which the nozzle tip portion and the substrate are moved relative to each other during the first moving work is a first speed, a moving speed at which the nozzle tip portion and the substrate are moved relative to each other during the second moving work is a second speed, and a moving speed at which the nozzle tip portion and the substrate are moved relative to each other in the lateral direction when the nozzle tip portion is moved relatively, obliquely downwardly and outwardly of the substrate after the second moving work is a third speed, the third speed may be higher than the first speed and the second speed.

With the discharge port at the second position in a plan view, the liquid column between the nozzle tip portion and the substrate has a small cross section as compared to a point in time at which the second moving work is started, and is considered to be likely to some extent to break apart. Therefore, the third speed at which the nozzle tip portion is moved relatively, obliquely downwardly and outwardly of the substrate is higher than the first speed and the second speed. Thus, the liquid column can smoothly break apart at a desired point in time at which the size of the liquid column is reduced. As a result, it is possible to prevent the thickness of the film of the processing liquid formed on the substrate from varying due to breaking of the liquid column at an unintended point in time.

(Item 8) A substrate processing apparatus according to item 8 that forms a film of a processing liquid on an upper surface of a substrate having an at least partially circular outer periphery, includes a substrate holder that holds the substrate, a nozzle having a nozzle tip portion in which a slit-like discharge port extending in one direction is formed, a mover that relatively moves at least one of the substrate and the nozzle with respect to another one in a lateral direction that intersects with a longitudinal direction of the discharge port, a lifter-lowerer that changes a length of a gap between the nozzle tip portion and the substrate in an upward-and-downward direction by moving at least one of the substrate held by the substrate holder and the nozzle with respect to another one in the upward-and-downward direction, a pressure adjuster that adjusts a pressure of a processing liquid in the nozzle, and a controller that controls the mover, the lifter-lowerer and the pressure adjuster, and the controller, by controlling the mover, the lifter-lowerer and the pressure adjuster, relatively moves the substrate and the nozzle in the lateral direction such that the processing liquid in the nozzle is drawn out from the discharge port onto the upper surface of the substrate due to capillary action that occurs in a gap in a state in which a pressure of the processing liquid in the nozzle is maintained at a predetermined first negative pressure, the gap equal to or smaller than a predetermined length is formed between the nozzle tip portion and the substrate, and the gap is filled with the processing liquid, and by controlling the lifter-lowerer and the pressure adjuster, thereafter changes a length of the gap between the nozzle tip portion and the substrate to a length larger than the predetermined length while adjusting a pressure of the processing liquid in the nozzle to a second negative pressure lower than the first negative pressure with the discharge port overlapping with part of the substrate in a plan view.

In the substrate processing apparatus, the substrate and the nozzle are relatively moved in the lateral direction with a gap equal to or smaller than the predetermined length formed between the nozzle and the upper surface of the substrate. At this time, the processing liquid drawn out from the slit-like discharge port is applied to the upper surface of the substrate due to capillary action exerted on the processing liquid in the gap. During the above-mentioned movement, the pressure of the processing liquid in the nozzle is adjusted to the first negative pressure. This prevents the processing liquid from leaking from the discharge port without an occurrence of capillary action, and prevents an excessive amount of the processing liquid from leaking from the discharge port.

Further, with the above-mentioned configuration, after the substrate and the nozzle are relatively moved in the lateral direction, the pressure of the processing liquid in the nozzle is adjusted to the second negative pressure with the discharge port overlapping with part of the substrate in a plan view. Further, the length of the gap between the nozzle tip portion and the substrate is larger than the predetermined length. Thus, an excess portion of the processing liquid applied to part of the substrate and its vicinity is sucked into the nozzle from the discharge port through the liquid column, and the cross section of the liquid column connecting the substrate to the nozzle tip portion is reduced. Therefore, even in a case in which part of the liquid column flows onto the substrate when the liquid column breaks apart between the nozzle tip portion and the substrate, a flow rate is reduced. Therefore, local thickening of the film of the processing liquid on the upper surface of the substrate is reduced.

As a result, it is possible to make the thickness of the film of the processing liquid applied onto the substrate be uniform while suppressing wasteful consumption of the processing liquid.

(Item 9) A substrate processing method according to item 9 of forming a film of a processing liquid on an upper surface of a substrate having an at least partially circular outer periphery, includes holding the substrate with use of a substrate holder, preparing a nozzle having a nozzle tip portion in which a slit-like discharge port extending in one direction is formed, a first moving step of relatively moving the substrate and the nozzle in a lateral direction of the nozzle while supplying the processing liquid onto the upper surface of the substrate from the discharge port, with a gap equal to or smaller than a predetermined length formed between the nozzle tip portion and the substrate and with the gap filled with the processing liquid, and a second moving step of further relatively moving the substrate and the nozzle in the lateral direction such that a liquid column connecting the processing liquid present on the upper surface of the substrate to the processing liquid adhering to an outer surface of the nozzle tip portion changes from a liquid contact state in which the liquid column is in contact with the processing liquid present in the discharge port to a non-contact state in which the liquid column is not in contact with the processing liquid present in the discharge port after the first moving step is performed.

With the substrate processing method, the processing liquid is applied onto the upper surface of the substrate with use of the nozzle having the slit-like discharge port during the first moving work. Therefore, wasteful consumption of the processing liquid is suppressed.

At a point in time at which the first moving step ends, the gap between the nozzle tip portion and the substrate is filled with the processing liquid. When the distance between the nozzle tip portion and the substrate increases, a liquid column is formed between the processing liquid adhering to the outer surface of the nozzle tip portion and the processing liquid applied onto the substrate. When the liquid column breaks apart while being in the liquid contact state, the processing liquid in the nozzle may be excessively drawn out from the discharge port onto the substrate depending on the relationship among the gap between the nozzle tip portion and the substrate, the physical properties of the outer surface of the nozzle tip portion, the surface tension of the processing liquid, and the like.

In contrast, with the above-mentioned method, during the second moving step, the liquid column changes from the liquid contact state to the liquid non-contact state without breaking apart. Therefore, even when the liquid column breaks apart after the second moving work, the processing liquid in the nozzle is not excessively drawn out from the discharge port onto the substrate at the time of breaking. Therefore, local thickening of the film of the processing liquid on the upper surface of the substrate is reduced.

As a result, it is possible to make the thickness of the film of the processing liquid applied onto the substrate be uniform while suppressing wasteful consumption of the processing liquid.

(Item 10) The substrate processing method according to item 9, wherein supply of the processing liquid onto the upper surface of the substrate in the first moving step may include drawing out the processing liquid in the nozzle from the discharge port onto the upper surface of the substrate by causing capillary action to occur in the gap.

In this case, in the first moving step, the processing liquid drawn out from the slit-like discharge port is applied to the upper surface of the substrate due to capillary action exerted on the processing liquid in the gap between the nozzle tip portion and the substrate. Therefore, the nozzle can be configured such that the processing liquid in the nozzle is not discharged from the discharge port with capillary action not exerted.

(Item 11) A substrate processing method according to item 11 of forming a film of a processing liquid on an upper surface of a substrate having an at least partially circular outer periphery, includes holding the substrate with use of a substrate holder, preparing a nozzle having a nozzle tip portion in which a slit-like discharge port extending in one direction is formed, a first pressure adjusting step of adjusting a pressure of the processing liquid in the nozzle to a predetermined first negative pressure, a first gap forming step of forming a gap equal to or smaller than a predetermined length between the nozzle tip portion and the substrate by moving at least one of the substrate held by the substrate holder and the nozzle with respect to another one in an upward-and-downward direction, a moving step of relatively moving at least one of the substrate and the nozzle with respect to another one in a lateral direction that intersects with a longitudinal direction of the discharge port such that the processing liquid in the nozzle is drawn out from the discharge port onto the upper surface of the substrate due to capillary action that occurs in a gap formed between the nozzle tip portion and the substrate with the gap filled with the processing liquid in a period during which the first pressure adjusting step and the first gap forming step are performed, a second pressure adjusting step of adjusting the pressure of the processing liquid in the nozzle to a second negative pressure lower than the first negative pressure with the discharge port overlapping with part of the substrate in a plan view after the moving step, and a second gap forming step of changing a length of a gap between the nozzle tip portion and the substrate to a length larger than the predetermined length during the second pressure adjusting step.

With the substrate processing method, the substrate and the nozzle are relatively moved in the lateral direction with the gap equal to or smaller than the predetermined length formed between the nozzle and the upper surface of the substrate. At this time, the processing liquid drawn out from the slit-like discharge port is applied to the upper surface of the substrate due to capillary action exerted on the processing liquid in the gap. During the above-mentioned movement, the pressure of the processing liquid in the nozzle is adjusted to the first negative pressure. This prevents the processing liquid from leaking from the discharge port without an occurrence of capillary action, and prevents an excessive amount of the processing liquid from leaking from the discharge port.

Further, with the above-mentioned configuration, after the substrate and the nozzle are relatively moved in the lateral direction, the pressure of the processing liquid in the nozzle is adjusted to the second negative pressure with the discharge port overlapping with part of the substrate in a plan view. Further, the length of the gap between the nozzle tip portion and the substrate is larger than the predetermined length. Thus, an excess portion of the processing liquid applied to part of the substrate and its vicinity is sucked into the nozzle from the discharge port through the liquid column, and the cross section of the liquid column connecting the substrate to the nozzle tip portion is reduced. Therefore, even in a case in which part of the liquid column flows onto the substrate when the liquid column breaks apart between the nozzle tip portion and the substrate, a flow rate is reduced. Therefore, local thickening of the film of the processing liquid on the upper surface of the substrate is reduced.

As a result, it is possible to make the thickness of the film of the processing liquid applied onto the substrate be uniform while suppressing wasteful consumption of the processing liquid.

With the substrate processing apparatus and the substrate processing method according to the above-mentioned embodiment, because the wasteful consumption of the processing liquid is suppressed, it is not necessary to generate a large amount of the processing liquid. Therefore, it is possible to contribute to a reduction in pollution of a global environment caused by the processing liquid.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A substrate processing apparatus that forms a film of a processing liquid on an upper surface of a substrate at least partially having a circular outer periphery, comprising:

- a substrate holder that holds the substrate;
- a nozzle having a nozzle tip portion in which a slit discharge port extending in one direction is formed;
- a mover that relatively moves at least one of the substrate and the nozzle with respect to another one in a lateral direction that intersects with a longitudinal direction of the discharge port; and
- a controller that controls the mover; and
- a lifter-lowerer that changes a length of a gap between the nozzle tip portion and the substrate in an upward-and-downward direction by moving at least one of the substrate held by the substrate holder and the nozzle with respect to another one in the upward-and-downward direction, the controller causing the mover to perform:

- a first moving work for relatively moving the substrate and the nozzle in the lateral direction while supplying the processing liquid onto the upper surface of the substrate from the discharge port, with the gap that is equal to or smaller than a predetermined length formed between the nozzle tip portion and the substrate and with the gap filled with the processing liquid; and a second moving work for further relatively moving the substrate and the nozzle in the lateral direction such that a liquid column connecting the processing liquid present on the upper surface of the substrate to the processing liquid adhering to an outer surface of the nozzle tip portion changes from a liquid contact state in which the liquid column is in contact with the processing liquid present in the discharge port to a liquid non-contact state in which the liquid column is not in contact with the processing liquid present in the discharge port after the first moving work, and the controller, by controlling the lifter-lowerer, further maintaining the length of the gap between the nozzle tip portion and the substrate to a length equal to or smaller than the predetermined length during the first moving work, changing the length of the gap between the nozzle tip portion and the substrate to a length larger than the predetermined length after the first moving work ends and before the second moving work is started, and maintaining the length of the gap between the nozzle tip portion and the substrate larger than the predetermined length during the second moving work.

2. The substrate processing apparatus according to claim 1, wherein supply of the processing liquid onto the upper surface of the substrate in the first moving work includes drawing out the processing liquid in the nozzle from the discharge port onto the upper surface of the substrate by causing capillary action to occur in the gap.

3. The substrate processing apparatus according to claim 1, wherein the discharge port of the nozzle passes through an at least partial area of the substrate in a plan view and moves to a first position overlapping with a predetermined portion in a peripheral portion of the substrate due to the first moving work, and moves from the first position to a second position not overlapping with the substrate in a plan view due to the second moving work.

4. The substrate processing apparatus according to claim 1, further comprising a pressure adjuster that adjusts a pressure of the processing liquid in the nozzle, wherein the controller, by controlling the pressure adjuster, adjusts the pressure of the processing liquid in the nozzle to a predetermined first negative pressure during the first moving work, and adjusts the pressure of the processing liquid in the nozzle to a second negative pressure higher than the first negative pressure after the first moving work ends and before the second moving work is started.

5. The substrate processing apparatus according to claim 1, wherein the controller, by controlling the mover and the lifter-lowerer, moves the nozzle tip portion relatively, obliquely downwardly and outwardly of the substrate in a side view in which the discharge port is viewed in a longitudinal direction after the second moving work.

6. The substrate processing apparatus according to claim 5, wherein in a case in which a moving speed at which the nozzle tip portion and the substrate are moved relative to each other during the first moving work is a first speed, a moving speed at which the nozzle tip portion and the substrate are moved relative to each other during the second moving work is a second speed, and a moving speed at which the nozzle tip portion and the substrate are moved relative to each other in the lateral direction when the nozzle tip portion is moved relatively, obliquely downwardly and outwardly of the substrate after the second moving work is a third speed, the third speed is higher than the first speed and the second speed.

7. A substrate processing apparatus that forms a film of a processing liquid on an upper surface of a substrate having an at least partially circular outer periphery, comprising:

a substrate holder that holds the substrate;

a nozzle having a nozzle tip portion in which a slit discharge port extending in one direction is formed;

a mover that relatively moves at least one of the substrate and the nozzle with respect to another one in a lateral direction that intersects with a longitudinal direction of the discharge port;

a lifter-lowerer that changes a length of a gap between the nozzle tip portion and the substrate in an upward-and-downward direction by moving at least one of the substrate held by the substrate holder and the nozzle with respect to another one in the upward-and-downward direction;

a pressure adjuster that adjusts a pressure of a processing liquid in the nozzle; and a controller that controls the mover, the lifter-lowerer and the pressure adjuster, and the controller, by controlling the mover, the lifter-lowerer and the pressure adjuster, relatively moving the substrate and the nozzle in the lateral direction such that the processing liquid in the nozzle is drawn out from the discharge port onto the upper surface of the substrate due to capillary action that occurs in the gap in a state in which the pressure of the processing liquid in the nozzle is maintained at a predetermined first negative pressure, the gap equal to or smaller than a predetermined length is formed between the nozzle tip portion and the substrate, and the gap is filled with the processing liquid; and by controlling the lifter-lowerer and the pressure adjuster, thereafter changing a length of the gap between the nozzle tip portion and the substrate to a length larger than the predetermined length while adjusting the pressure of the processing liquid in the nozzle to a second negative pressure lower than the first negative pressure with the discharge port overlapping with part of the substrate in a plan view.

* * * * *